(12) United States Patent
Martin

(10) Patent No.: US 12,173,231 B1
(45) Date of Patent: Dec. 24, 2024

(54) COMPOSITIONS AND METHODS FOR INCREASING PERMEABILITY IN HYDROCARBON SHALE FORMATIONS

(71) Applicant: Truox, Inc., Naples, FL (US)

(72) Inventor: Roy W. Martin, Naples, FL (US)

(73) Assignee: TRUOX, INC., Naples, FL (US)

( * ) Notice: Subject to any disclaimer, the term of this patent is extended or adjusted under 35 U.S.C. 154(b) by 0 days.

(21) Appl. No.: 18/768,521

(22) Filed: Jul. 10, 2024

Related U.S. Application Data

(60) Provisional application No. 63/666,289, filed on Jul. 1, 2024, provisional application No. 63/658,038, filed on Jun. 10, 2024, provisional application No. 63/651,052, filed on May 23, 2024, provisional application No. 63/646,008, filed on May 13, 2024.

(51) Int. Cl.
| | |
|---|---|
| *C09K 8/60* | (2006.01) |
| *C09K 8/584* | (2006.01) |
| *C09K 8/588* | (2006.01) |
| *C09K 8/68* | (2006.01) |
| *C09K 8/90* | (2006.01) |
| *E21B 43/16* | (2006.01) |
| *E21B 43/26* | (2006.01) |

(52) U.S. Cl.
CPC ............. *C09K 8/604* (2013.01); *C09K 8/584* (2013.01); *C09K 8/588* (2013.01); *C09K 8/68* (2013.01); *C09K 8/90* (2013.01); *E21B 43/16* (2013.01); *E21B 43/26* (2013.01); *C09K 2208/12* (2013.01)

(58) Field of Classification Search
CPC ..................................................... C09K 8/00
See application file for complete search history.

(56) References Cited

U.S. PATENT DOCUMENTS

| | | |
|---|---|---|
| 7,179,485 B1 | 2/2007 | Schneider |
| 11,028,314 B2 | 6/2021 | Gardner |
| 11,130,905 B2 | 9/2021 | Gardner |
| 11,155,480 B2 | 10/2021 | Moloney |

(Continued)

FOREIGN PATENT DOCUMENTS

| | | |
|---|---|---|
| CA | 2629744 | 5/2007 |

OTHER PUBLICATIONS

Aghanjanzadeh, "Wettability modification of oil-wet carbonate reservoirs using silica-based nanofluid: an experimental approach," Journal of Petroleum Science and Engineering 178(2019) Mar. 23, 2019, Elsevier B.V., pp. 700-710.

(Continued)

*Primary Examiner* — William D Hutton, Jr.
*Assistant Examiner* — Avi T Skaist
(74) *Attorney, Agent, or Firm* — Jeffrey S. Melcher; Melcher Patent Law PLLC

(57) ABSTRACT

A surface treatment composition for increasing permeability in a hydrocarbon shale formation during stimulation containing a solvent and an effective amount of at least one of a quaternary monosaccharide having from about 1 to 3 moles of quaternary functional groups and a quaternary saccharide having a number of the monosaccharide molecules ranging from about 2 to 20 bonded together by glycosidic linkage with from 1 to 3 moles of quaternary functional groups per molecule of the monosaccharide in the saccharide. A method of using the surface treatment for increasing permeability in a hydrocarbon shale formation during stimulation.

16 Claims, 19 Drawing Sheets

(56) References Cited

U.S. PATENT DOCUMENTS

| | | |
|---|---|---|
| 11,155,481 B2 | 10/2021 | Dhawan |
| 11,767,375 B2 | 9/2023 | Gardner |
| 2005/0014655 A1* | 1/2005 | Aston .................. C09K 8/16 507/211 |
| 2014/0128295 A1* | 5/2014 | Wagles ................. C09K 8/08 507/111 |
| 2016/0208591 A1* | 7/2016 | Weaver ................ C09K 8/602 |
| 2021/0108132 A1 | 4/2021 | Trabelsi |

OTHER PUBLICATIONS

Zhou, "Efficient inhibition of montmorillonite swelling through controlling flexibility structure of piperazine-based polyether Gemini quaternary ammonium salts," Chemical Engineering Journal 383 (2020), Oct. 15, 2019, Elsevier B.V,, 123190, pp. 1-12.

Smith, "Deep eutectic solvents (DESs) and their applications," Chemical Reviews, Oct. 10, 2014, 114 American Chemical Society, pp. 11060-11082.

Atilhan, "Review on chemical enhanced oil recovery, Utiliztion of ionic liquids and deep eutectic solvents," Journal of Petroleum Science and Engineering 205(2021) 108746, Apr. 2, 2021, Elsevier B.V., pp. 1-11.

Mohsenzadeh, "Effects of concentration, salinity, and injection scenario of ionic liquids analogue in heavy oil recovery enhancement," Journal of Petroleum Science and Engineering 133(2015) May 9, 2015, Elsevier B.V., pp. 114-121.

Mohsenzadeh, "Investigation of formation damage by deep eutectic solvents as new EOR agents," Journal of Petroleum Science and Engineering 129(2015) Mar. 2, 2015, Elsevier B.V., pp. 130-136.

Buckley, "Mechanisms and Consequences of Wettability Alteration by Crude Oils," Thesis submitted for the Degree of Doctor of Philosphy, Dept. of Petroleum Engineering, Heriot-Watt Univ., Edinburgh, United Kingdom, Sep. 1996, pp. 1-201.

\* cited by examiner

INVESTIGATING THE POTENTIAL OF SURFACTANTS IN IMPROVING THE PERFORMANCE OF STIMULATION FLUIDS IN ULTRA-TIGHT SHALES

| Surfactant Name | Type | Primary Component | pH | Relative Density |
|---|---|---|---|---|
| Surf A | Nonionic | Branched alcohol oxyalkylate | 5.0-7.0 | 0.99-1.03 |
| Surf B | Nonionic | Ethoxylated isodecylalcohol | 7.0-9.0 | 1.02-1.05 |
| Comp A | Complex Nanofluid | Proprietary Citrus Terpenes | 6.8-8.3 | 0.95-0.96 |
| Comp B | Complex Nanofluid | Proprietary Citrus Terpenes | 4.0-7.0 | 0.90-0.96 |
| Comp C | Complex Nanofluid | Proprietary Citrus Terpenes | 5.0-8.0 | 0.96-1.01 |

Fig. 1

Imbibition of water comprising surface treatment composition
Displaced oil from the pores coalesces oil droplets on the core surface Synergistic Effects of combining QMS and QMD

COMPOSITIONS AND METHODS FOR INCREASING PERMEABILITY IN HYDROCARBON SHALE FORMATIONS

FIELD OF THE INVENTION

The invention relates to compositions and methods of increasing permeability in hydrocarbon shale formations to increase oil production. The surface treatment compositions are applied to the water used to drill a wellbore and/or stimulate the hydrocarbon shale formation during hydraulic fracturing or chemical Enhanced Oil Recovery (i.e. tertiary recovery) to increase hydrocarbon productivity.

BACKGROUND OF THE INVENTION

The growing demand for fossil fuels due to the increased population has shifted the paradigm of the oil and gas industry to develop unconventional reservoirs. In recent decades, the extraction of oil and gas from shale reservoirs has increased in order to meet the current and future expected demand for oil and gas resources. Shale reservoir formations mainly comprise of water-sensitive clay minerals such as smectite, illite, montmorillonite, and kaolinite. Shale reservoir drilling operations often result in complicated wellbore instability problems due to the swelling of sensitive clay minerals present in the shale formations. The wellbore instabilities include bit balling, caving, sloughing, stuck pipe, and in severe cases, the collapse of the wellbore may occur. Therefore, the design and selection of drilling fluid play a significant role in minimizing the wellbore instability problems.

Drilling of shale reservoir requires specially designed drilling fluids with enhanced inhibition properties to minimize the shale swelling and hydration. Therefore, the choice of drilling fluids mainly depends on the cost of drilling fluid, environmental challenges, and shale inhibition characteristics. It is reported in the literature that oil-based mud (OBM) has exceptional shale inhibition characteristics, better lubricity and high temperature stability, preserves the integrity of wellbore formations, and is preferred for formations containing water-sensitive shale. The OBM is not frequently employed due to the high cost and stringent environmental regulations. On the other hand, water-based mud (WBM) provides excellent rheological properties, has low preparation cost, and is environmentally friendly compared to the OBM. However, the water contents in the WBM have a high affinity towards the water-sensitive shale in the wellbore formations, which leads to the hydration and swelling of shale. Various additives (shale inhibitors) were employed in the formulation of drilling fluids to modify the shale swelling and hydration properties.

Several drilling fluids additives were employed as shale inhibitors from the last few decades to enhance drilling fluid inhibition properties. The reported shale inhibitors in the literature include polymers; inorganic slats; polymer nanocomposites; glycols; amines and its derivatives, polymeric amines, dendrimers of amines, ionic liquids, nanoparticles, surface-modified nanoparticles, and surfactants. The shale inhibition phenomenon is categorized into two classes, inhibition by physically sealing the micropores and small cracks, and chemical inhibition, in which inhibitor molecules encapsulate the shale surface to prevent the interaction of shale with water. The inhibitors that follow the chemical inhibition are considered as superior compared to the inhibitors who follow the physical sealing mechanism. There are some limitations to the applications of the additives mentioned above. For instance, potassium chloride has enhanced inhibition capacity, but it cannot be used with high concentration due to high toxicity to the marine environment. It also stimulates the dispersion of kaolin clay and results in bit balling. Polymers and their composites as shale swelling inhibitors are not effective at high temperature conditions encountered in the deep wells. The amine-based shale swelling inhibitors have limited applications due to some associated disadvantages that include toxicity, pH-dependent inhibition, high dosage, and low temperature tolerance. For nanoparticles, their homogenous distribution in drilling fluids and high impact on rheological properties are the main concern in their application. Considering the limitations of current solutions, developing a novel shale swelling inhibitor with terrific inhibition performance is still a research hotspot. Therefore, a new class of chemical inhibitors such as quaternary monosaccharides are introduced, which can play a significant role in developing drilling fluids with high inhibition properties.

Furthermore, oil and gas reside in the pores of the rock comprising the hydrocarbon shale formation. There must be continuity or permeability in the pore-space, in order to be mineable. If the porosity or permeability is low, it is difficult to extract the oil. To increase the permeability, fracturing techniques are used.

A hydraulic fracture is formed by pumping the fracturing fluid into the well-bore at a rate sufficient to increase pressure down-hole at the target zone (determined by the location of the well casing perforations) to exceed that of the fracture gradient (pressure gradient) of the rock. Fracturing splits open the reservoir rocks by use of fluids, pressure inside by powerful pumps. With high pressure pumps sand (proppant) along with fracturing fluid is pumped in the well. The pressure is maintained until the fracture reaches the desired length. Suspended sand contained in thick water-based fluid fills the fracture (prevent it from collapsing) and then the pressure is released. The sand filled fractures form porous networks that permit the formation fluids to flow through and be recovered.

After the fracture is complete, the viscosity of the fluid is decreased by use of breakers comprising oxidizers, enzymes or acids that degrade the gels viscosity so the fracturing fluid can easily flow back. With high pressure pumps, sand along with thick fracturing fluid is pumped in the well. The pressure is maintained until the fracture reaches the desired length. Suspended sand (proppant) in a viscous water-based slurry fills the fracture. When the frac is completed, the proppant prevents the fractures formed from completely closing, resulting in networks or porous channels that allow the formation fluids (hydrocarbons and brine) to flow from the formation and be recovered.

While hydraulic fracturing increases the porous network within the hydrocarbon shale formation, the permeability of the formation is often restrictive due to the oil-wet nature of the shale. The oil recovered after fracking can be considered the low hanging fruit. The high pressure well pushes formation fluids freely through the porous network. As the well ages and pressure drops, artificial lift is incorporated. Eventually oil recovery becomes inefficient and methods of enhanced oil recovery are employed.

Enhanced Oil Recovery (tertiary recovery) is used to extract additional oil from the formation when production from primary and secondary methods are no longer sufficiently profitable. Tertiary recovery methods often inject water with surfactants to enhance oil recovery. The surfactants improve the wettability of the formation but the improvements are short lived. Surfactants are known to improve the angle of contact. However, when applied in chemical Enhanced Oil Recovery, the results are temporary. The surfactants are eluted, and their benefits are diminished over time. The need to implement enhanced oil recovery is the result of poor permeability. As previously described, the low hanging fruit has been recovered. Now extensive cost must be incurred to alter the permeability to recovery additional oil. The ability to significantly increase the permeability of the formation during fracking would extend the life and productivity of the well.

Imbibition is the absorption of one substance by another, specifically the uptake of water into the pores of the formation. These pores in tightly packed shale formations behave like capillaries. The capillary pressure (Pc) is determined by the general equation:

$$Pc = \frac{2_\Upsilon COS\Theta}{r}$$

Where Pc is capillary pressure, Y is interfacial tension (IFT), e is the angle of contact and r is the pore radius.

Reducing the angle of contact within the capillaries (porous network) of the formation increases the capillary pressure thereby allowing water to spontaneously imbibe into the rock, displacing more hydrocarbons from the shale.

Buckley et al. concluded that wettability alteration by crude oil was a result of four different processes. These four processes are summarized as follows:
a) Adsorption of oleic and polar components onto the rock surface in the absence of a water film resulting in the alteration of wettability from water-wet to oil-wet.
b) Precipitation of asphaltene on the rock surface due to the crude oil acting as a solvent resulting in alteration of wettability to weak water-wet.
c) Instability of the water film on the rock surface and the potential of polar components in the crude oil to get adsorbed on the rock surface and alter wettability due to unique acid/base interactions which control the charges at the oil-water and water-solid interface.
d) Ion binding between high valence ions and highly charged sites resulting in wettability alteration to an oil-wet state.

In order to maximize hydrocarbon recovery resulting from drilling the wellbore, hydraulic fracturing as well as Enhanced Oil Recovery (tertiary recovery), the permeability of the shale formation needs to be converted to a water-wet condition in such a way as to first transition the wettability to water-wet and then sustain the water-wet condition while not damaging the formation due to clay swelling.

There is a need for a surface treatment compositions that can inhibit clay swelling as well as alter the wettability of the porous network within the hydrocarbon shale formation to water-wet, and sustain the water-wet condition by altering the surface chemistry (passivate) to insulate the surface from the mechanisms that would otherwise allow the formation fluids to alter the wettability back to intermediate-wet or oil-wet. The surface treatment compositions of the invention condition and passivate the surfaces, wherein the passivated surfaces induce hydrogen bonding between the water and passivator's polar surfaces causing the water to spread further reducing the angle of contact, essentially approaching zero.

SUMMARY OF THE INVENTION

The compositions and methods of the invention increase hydrocarbon recovery resulting from hydraulic fracturing and tertiary recovery methods (Enhanced oil recovery). When the surface treatment composition is applied to the porous network in the shale formation, the treatment displaces adsorbed organic compounds (conditions), then chemically adsorbs to the formation surfaces thereby changing the wettability of the formation from oil-wet or intermediate-wet to water-wet (passivates). The passivator chemisorbs to the formation surfaces exposing polar groups thereby forming a hydrophilic film that is persistent. The polar surface dramatically increases the wetting rate or the spreading of the water in contact with the surfaces. Surfaces treated with surfactants reduce the angle of contact, however once equilibrium is established the contact angle remains stable. In contrast, when the surface is treated with the surface treatment composition comprising a passivator, the water droplet continues to spread, unable to reach a stable equilibrium. The angle of contact continues to decline as it essentially approaches zero.

Furthermore, the quaternary saccharides of the invention inhibit clay swelling during stimulation as well as during well drilling.

An objective of the invention is to increase the permeability of a hydrocarbon shale formation by providing a surface treatment composition that conditions and passivates the surfaces of the hydrocarbon shale formation. The surface treatment composition can be applied during hydraulic fracturing or during enhanced oil recovery operations (also referred to as tertiary recovery). The surface treatment composition increases the wettability, transitioning from oil-wet or intermediate-wet to water-wet within the porous network of a formation and destabilizes the interface between water and the passivated surfaces causing the water to spread further decreasing the angle of contact.

Hydrocarbon rich shale formations are generally oil-wet or intermediate-wet resulting from adsorbed hydrocarbons on the surfaces of the formation. Oil-wet surfaces suppress capillary forces, thereby restricting formation fluids from flowing through the pores. The surface treatment compositions of the invention convert the surfaces within the porous network from oil-wet or intermediate-wet to water-wet. Water-wet surfaces increase capillary pressure thereby increasing permeability. Increasing permeability improves flow of formation fluids and subsequent hydrocarbon productivity. Furthermore, the surface treatment composition transitions the surface of the formation to water-wet condition that is persistent. The treated (passivated) surface of the formation is polar which destabilizes the interface between a water droplet and the surface inducing spreading of the water. The angle of contact of the spreading water decreases essentially approaching zero.

Another objective of the invention is to provide methods for applying the surface treatment composition.

One method is to apply the surface treatment to the fracturing fluid during hydraulic fracturing.

Yet another method is to apply the surface treatment composition to the water used during chemical Enhanced Oil Recovery.

Yet another objective of the invention is to provide an encapsulated granular solid form of the surface treatment composition. The encapsulate granular treatment is applied during hydraulic fracturing along with the proppant. The granular treatment provides a means for targeted release within the formation. As the temperature increases the polymer coating degrades releasing the surface treatment composition.

The objectives of the invention can be obtained by applying an effective amount of surface treatment composition to a hydrocarbon shale formation, said composition comprising: a passivator comprising at least one of a quaternary monosaccharide having from about 1 to 3 moles of quaternary functional groups and a quaternary saccharide having a number of monosaccharide molecules ranging from about 2 to 20 bonded together by glycosidic linkage with from 0.5 to 3 moles of quaternary functional groups per molecule of the monosaccharide in the saccharide; a conditioner comprising at least one of a surfactant, a hydrotrope, and a terpene; water; and wherein the weight percent ratio of the primary passivator and the conditioner ranges between 20:1 to 1:20 respectively.

Another objective of the invention can be obtained by applying a method for inhibiting swelling of clay embedded in shale during stimulation of a hydrocarbon shale formation, the method comprising: inserting a composition into a well bore, wherein the composition comprising water and an effective amount oat least one of a quaternary monosaccharide having from about 1 to 3 moles of quaternary functional groups and a quaternary saccharide having a number of monosaccharide molecules ranging from about 2 to 20 bonded together by glycosidic linkage with from 0.5 to 3 moles of quaternary functional groups per molecule of the monosaccharide in the saccharide; and wherein absorption and adsorption of quaternary monosaccharide and/or quaternary saccharide inhibits swelling of the clay.

BRIEF DESCRIPTION OF THE DRAWINGS

FIG. 1 describes various commercially available surfactant treatments used to test their effect on contact angle of hydrocarbon saturated core samples.

FIG. 16C shows the spread of the water from a top-down view.

FIG. 18A and FIG. 18B show at 2000 ppm actives, the effect on inhibiting clay swelling was comparable but minimal (approximately 5% reduction). However, combining 1000 ppm 1 mol QMS and 1000 ppm 1 mol QMD dramatically inhibited clay swelling by over 35%, a 6-fold (6×) reduction in volume FIG. 18C. Furthermore, by increasing the charge density of QMS to 2 mol of quaternary functionality, the same concentration of treatments resulted in over 59% reduction in clay swelling compared to either QMS or QMD used alone at the same concentration. Modest increases in concentrations of either the QMS or QMD further reduced clay swelling as illustrated. Further still, substituting either QMS or QMD with 1 gpt (70% active) choline chloride dramatically reduced clay swelling. The data clearly illustrates there is a synergistic effect and supports the theories of absorption and adsorption of QMS and QMD attributed to charge density and molecular weight.

DETAILED DESCRIPTION OF THE INVENTION

Figure 2:
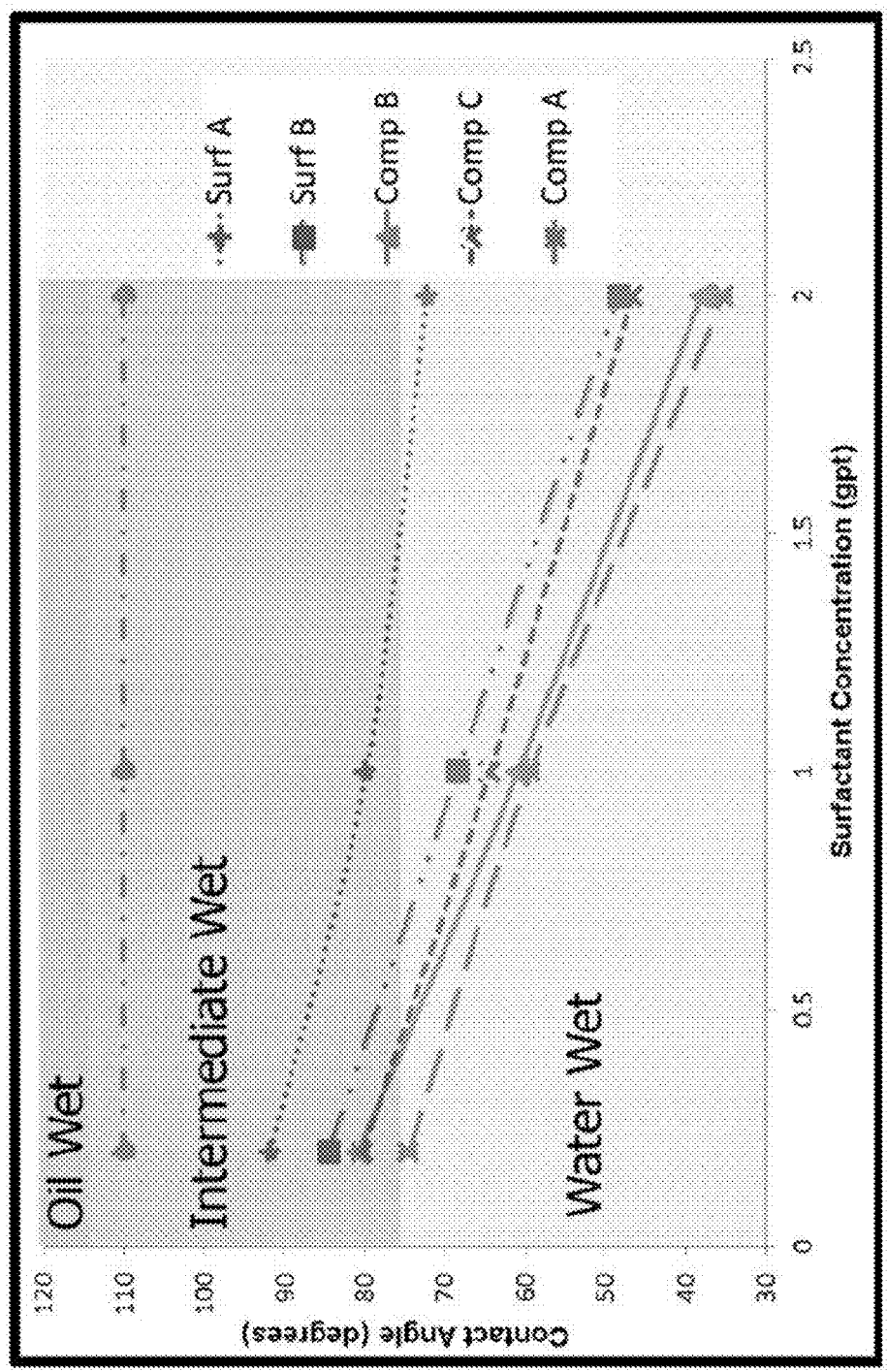
FIG. 2 illustrates the contact angles achieved at various concentrations of the surfactant treatments.
Figure 3:
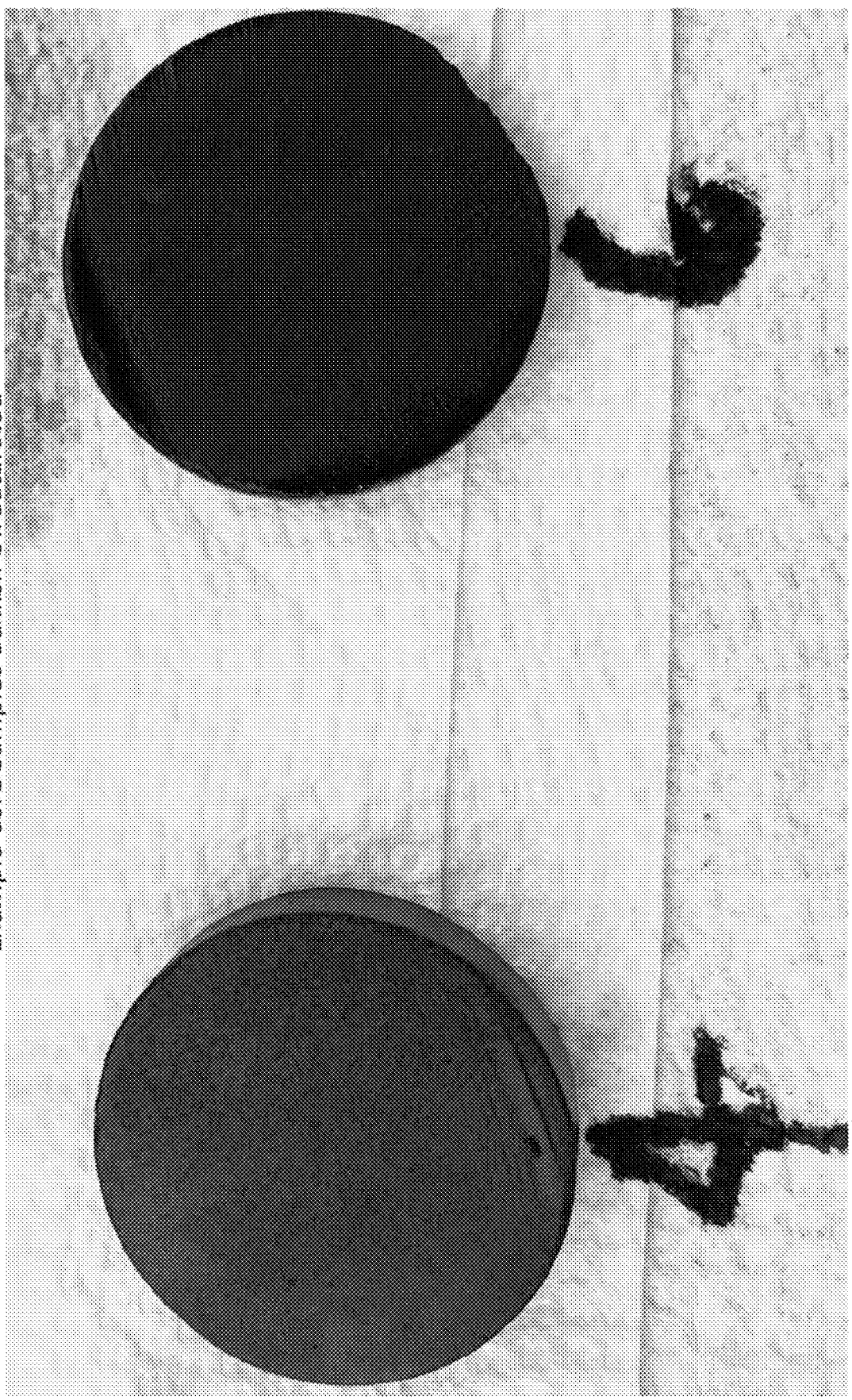
FIG. 3 illustrates Bakken core samples that have been saturated with Bakken oil.
Figure 4:
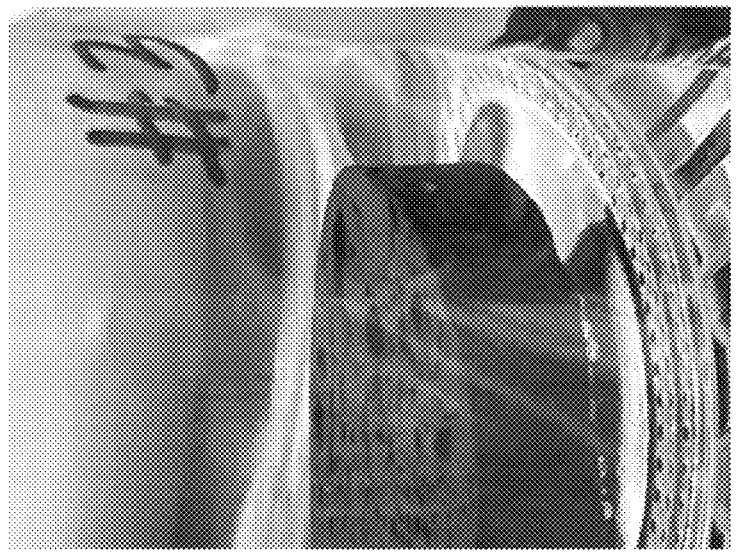
FIG. 4 shows the result of imbibition of the water comprising surface treatment composition.
Figure 5C:
FIGS. 5A, 5B and 5C show the dome of a water droplet before and after treatment of core samples using a 1:1 blend of choline chloride and Stepfac 8181 at a dosage of 5000 ppm at 200° F. Then the sample was treated with passivator at 100 ppm at the same temperature for approximately 72 hrs.
Figure 5B:
Figure 5A:
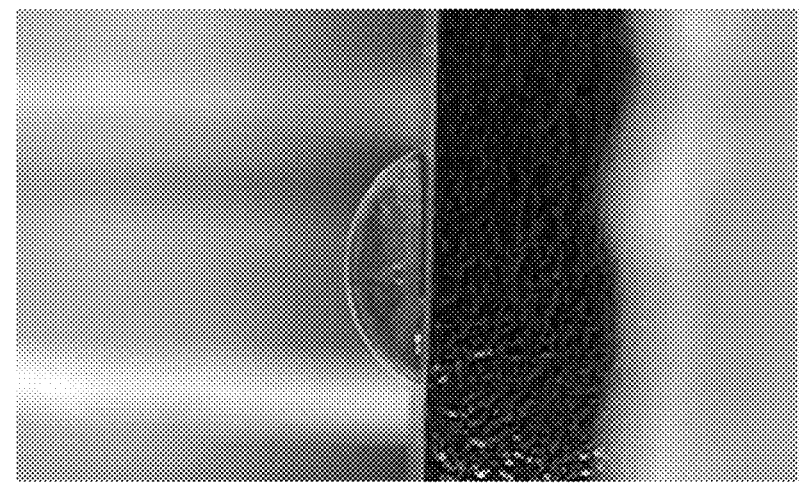
Figure 6C:
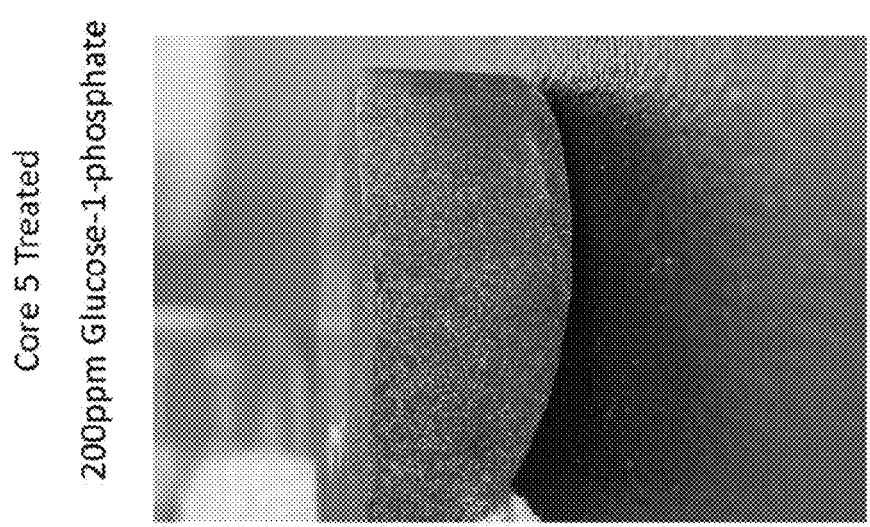
FIG. 6A, FIG. 6B and FIG. 6C show contact angles before and after treatment of core samples using a 1:1.5 blend of choline chloride and Stepfac 8181 respectfully at a dosage of 5000 ppm. Then the sample was treated with passivator at 200 ppm at the same temperature for approximately 72 hrs.
Figure 6B:
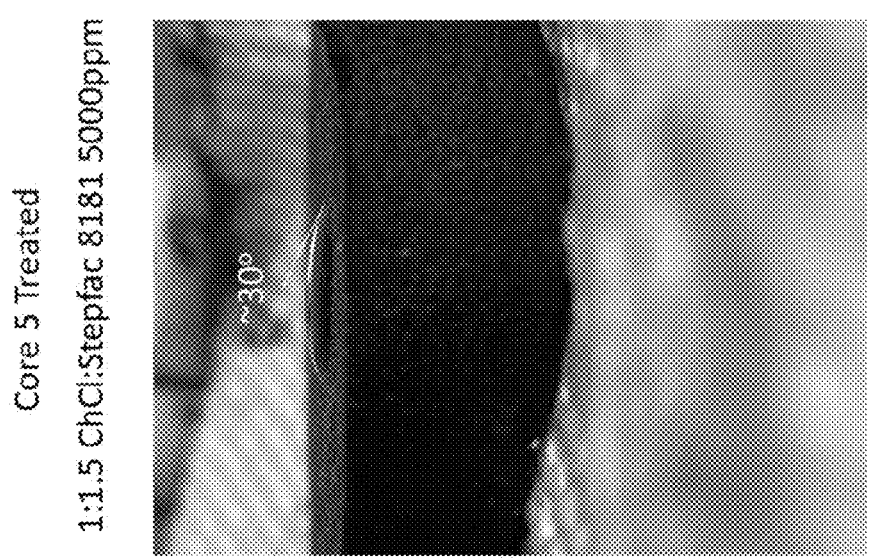
Figure 6A:
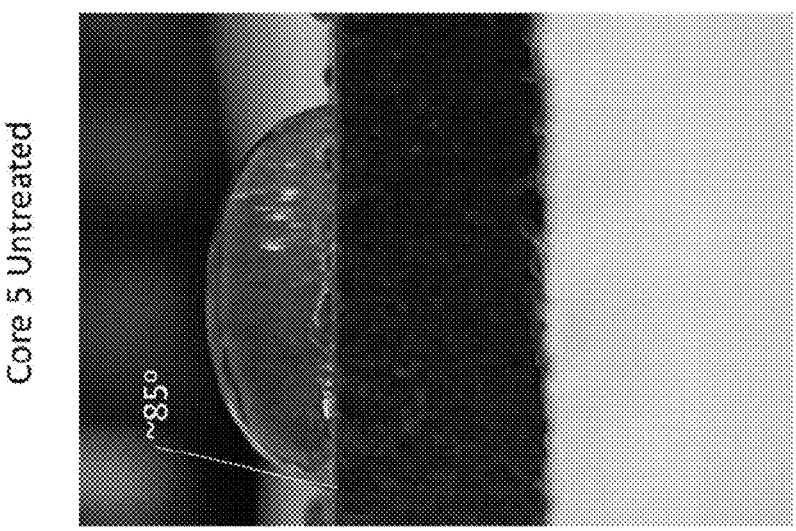
Figure 7B:
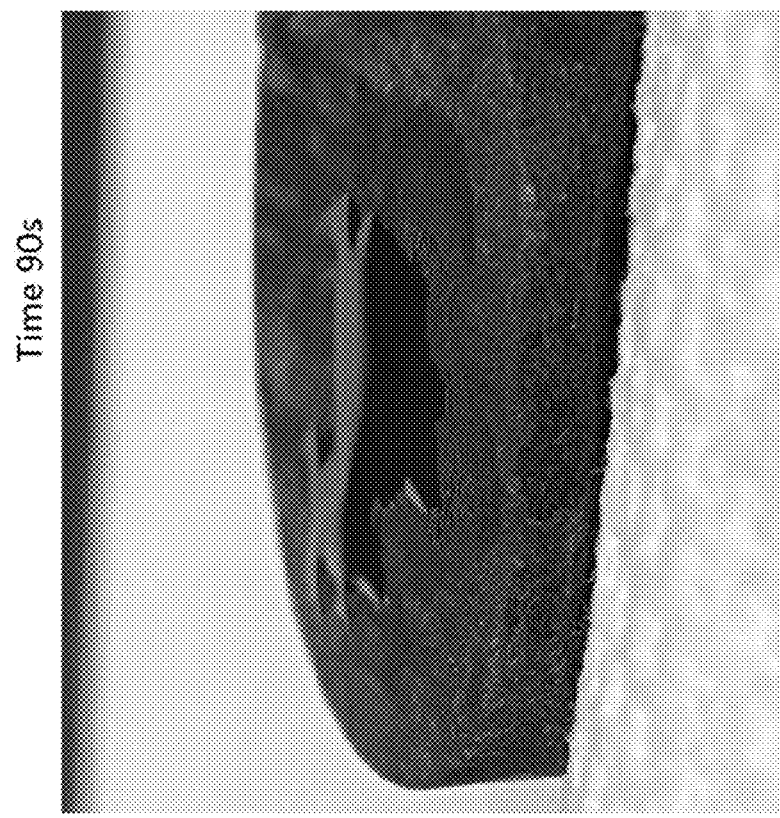
FIG. 7A and FIG. 7B show the effect of treating a core sample with a surface treatment fluid comprising 500 ppm Stepfac 8181, 1000 ppm Glucose-1-phosphate 2-amino-2-methylpropanol (silicate adsorbent) for pH adjustment. A sample was heated to 200° F. and allowed to react for approximately 3 weeks. After thoroughly rinsing the treated core sample, a water drop applied to the surface acquired a water-wet angle of contact However the passivated surfaces destabilized the interface between the water and surfaces causing the water to spread in all directions wetting the passivated surfaces. After 90 seconds, the water droplet had spread to where there was a minimal angle of contact. While not illustrated, the water continued to spread until the angle of contact essentially approached zero.
Figure 7A:
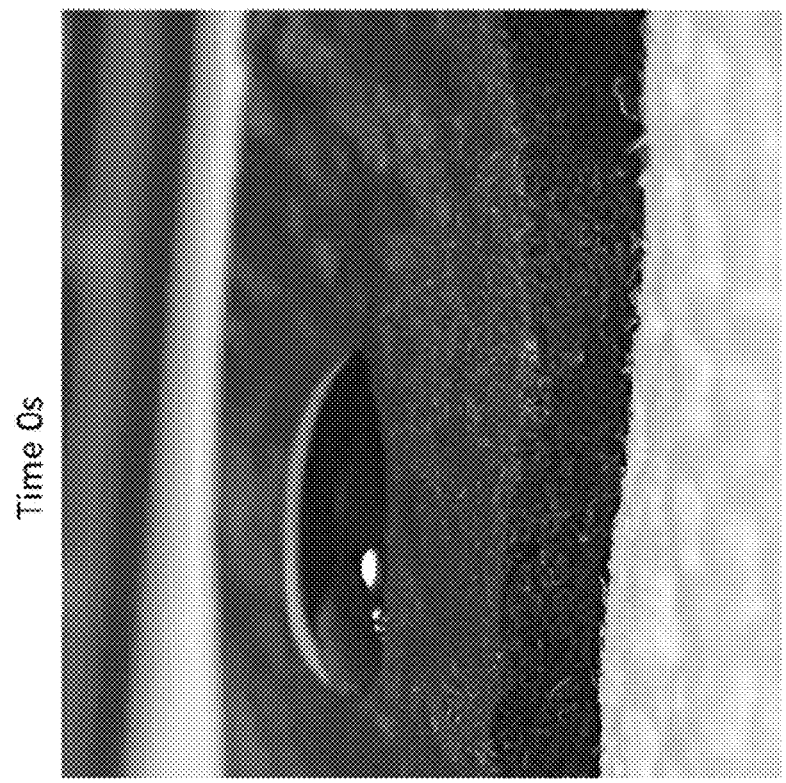
Figure 8:
FIG. 8 compares the effect of different concentrations of passivator with and without surfactant. Images illustrate that the passivator alone can displace a substantial amount of oil, even without the presence of a conditioner.

The following terms will be used throughout the specification and will have the following meanings unless otherwise indicated.

"A" or "an" means "at least one" or "one or more" unless otherwise indicated.

When referring to a group, "at least one . . . and . . . " in the specification and claims is synonymous with "and/or". For example, "at least one of A, B and C" means A alone, B alone, C alone, or any combination of A, B or C.

"Comprise", "have", "include" and "contain" (and their variants) are open-ended linking verbs and allow the addition of other elements when used in a claim. "Consisting of" is closed, and excludes all additional elements.

"Consisting essentially of" excludes additional material elements, but allows the inclusions of non-material elements that do not substantially change the nature of the invention.

Definitions

Various compositions and methods of the invention are described below. Although particular compositions and methods are exemplified herein, it is understood that any of a number of alternative compositions and methods are applicable and suitable for use in practicing the invention.

As used herein "shale swelling" and "clay swelling" are used interchangeably. Shale is the proper term for a sedimentary rock that is composed of clay minerals that are embedded in the shale, while clay refers to a specific type of mineral that is found in various forms. Shale is formed from the compaction of clay, silt, and organic matter over time, while clay is a fine-grained mineral that is typically formed from the weathering of other rocks. When testing is performed to determine the degree of inhibition a clay modifier has on the swelling of a clay, the testing is performed on clays exemplified by illite, montmorillonite, and kaolinite. If the clay embedded in the sedimentary rock swells, the shale permeability is compromised.

As used herein, "surface treatment composition" describes a composition that conditions and passivates the surfaces within a hydrocarbon shale formation increasing wettability and permeability.

As used herein, "an effective amount" refers to the amount (such as a concentration) of an additive to achieve the desired effect. With regard to application of a surface treatment composition, an effective amount is sufficient to condition and passivate the surfaces to lower the angle of contact of a water droplet on the treated surfaces to less than 75° and establish an unstable condition whereby the water spreads, reducing the angle of contact over time to where it essentially approaches zero. With regard to inhibiting clay swelling, an effective amount is sufficient to inhibit the swelling of clay embedded in the shale so as to not reduce the formations permeability (i.e. damage the formation).

As used herein, "drilling fluid composition" comprises at least water and an effective amount of at least one of a quaternary monosaccharide having from about 1 to 3 moles of quaternary functional groups, and a quaternary saccharide having a number of monosaccharide molecules ranging from about 2 to 20 bonded together by glycosidic linkage with from about 0.5 to 3 moles of quaternary functional groups per molecule of the monosaccharide.

As used herein, "condition and passivate" describes the effects the surface treatment composition has on the surfaces of the hydrocarbon shale formation. Conditioning describes the dispersion of both physically adsorbed and chemisorbed oil from the surfaces. Passivation takes place by the chemisorption of the passivator to the surface resulting in coating the surface with polar functional groups that attract water.

As used herein, "destabilizes the interface between water and the passivated surfaces" describes the effect the passivated surfaces have on a water droplet. A droplet of water applied to the surface of shale will reach an equilibrium and achieve a stable angle of contact. The passivated surfaces have polar groups distributed across the passivated surfaces. The better the distribution of the passivator the more polar the passivated surfaces. Water is attracted to the polar groups and causes the water droplet to spread. The time required to spread is the wetting rate. Since equilibrium between the passivated surfaces and water droplet is not achieved, the water spreads until the contact angle essentially approaches zero.

As used herein, "essentially approaching zero" also "essentially approaches zero" describes the effect on the angle of contact between a water droplet and the passivated surfaces. The interface between the water droplet and passivated surfaces is unstable, thereby inhibiting equilibrium from being established. The water droplet spreads across the passivated surfaces reducing the angle of contact. When the passivated surfaces have been treated with an effective amount of surface treatment composition, a water droplet will obtain an angle of contact that is water-wet and the angle of contact of the water in contact with the passivated surfaces will continue to decrease as the water spreads to <30°, more preferred <20° and most preferred <10° over a period of time.

As used herein, "monosaccharides" comprises a hydrocarbon group having a number of carbon atoms ranging from 3 to 8 that are substituted with hydroxyl and carbonyl groups.

As used herein, "quaternary monosaccharide" also referred to as QMS comprises a monosaccharide having from 1 to 3 moles of quaternary functional groups.

As used herein, "quaternary saccharide" also referred to as QS comprises at least one of saccharide having a number of the monosaccharide molecules ranging from about 2 to 20 bonded together by glycosidic linkage with from about 0.5 to 3 moles of quaternary functional groups per molecule of the monosaccharide, more preferred about 1 to 3 moles of quaternary functionality. Quaternary maltodextrin also referred to as QMD represents one non-limiting example of QS and is referenced throughout the application to highlight the synergistic effects of combining quaternary monosaccharides (QMS) with quaternary saccharides (QS) exemplified by quaternary maltodextrin (QMD).

The monosaccharide can be sourced from any suitable source. For example, corn starch is processed into various saccharides typically using enzymes to convert the starch into various molecular weight saccharides comprised of predominantly glucose units such as dextrin, maltodextrin, glucose (dextrose), dextrose syrup and high fructose corn syrup which comprises a blend of glucose and fructose. Preferred monosaccharides are glucose and fructose based on present day availability. The most preferred monosaccharide is glucose because glucose exhibits a superior temperature resistance compared to the other monosaccharides when used in the present invention.

As used herein, "permeability" describes the state or quality of the formation and porous network within the formation to allow liquids and/or gases to pass through it.

As used herein, "increased permeability" describes the improved flow of liquids and/or gases through the porous network within the formation resulting from conditioning and passivating the surfaces thereby transitioning from oil-wet or intermediate-wet to water-wet.

As used herein, "contact angle" and "angle of contact" are interchangeable and describe the angle between the water and the surfaces where they meet.

As used herein "wettability" describes the ability of a water droplet to either form a bead or spread out (flatten) on a surface (i.e. rock comprising the formation). The contact angle (also referred to as a wetting angle) is formed when a drop of liquid is placed on a material surface and the drop forms a dome shape on the surface. The angle formed between the surface and the line tangent to the edge of the drop of the water is called the contact angle (θ). As the drop of water spreads across a surface and the dome becomes flatter, the contact angle becomes smaller. If the drop of water beads up on the surface (as you might see on a waxed car) the dome becomes taller and the angle becomes larger. Based on measuring contact angle, the wettability herein is defined as follows: 0°-75° water-wet, 75°-115° intermediate-wet, 115°-180° oil-wet.

As used herein, "increased wettability" describes the ability to shift the surfaces of the treated formation from oil-wet or intermediate-wet to water-wet, thereby increasing capillary forces that enhances hydrocarbon recovery.

As used herein, "wetting rate" is the time required for a drop of water to spread across the surface. When the wetting rate is high the droplet of water will quickly spread lowering the angle of contact. When the wetting rate is low, the droplet of water will take the form of a bead and retain that form keeping the angle of contact high for an extended period of time. For example, when a droplet of water is applied to an oil-wet or intermediate-wet surface, the water will bead and remain in the shape of a dome, no spreading of the water occurs so the wetting rate is essentially infinitely long. When a water droplet is applied to a passivator treated surface, the droplet will begin to spread thereby lowering the angle of contact. Increasing the surface area covered by polar groups reduces the time for the water droplet to spread across the surface thereby increasing the wetting rate.

As used herein "hydrocarbon shale formation" comprises a shale formation that is rich in hydrocarbons such as light, medium and/or heavy crude oils and/or light gases such as methane.

As used herein, "fracturing fluid" comprises at least water and proppant, and typically a variety of chemicals used for hydraulic fracturing a hydrocarbon shale formation.

As used herein, "surface treatment fluid" describes a water-based fluid comprising an effective amount of surface treatment composition used to stimulate the hydrocarbon shale formation. The surface treatment fluid comprises water and may comprise other chemicals. In the case where stimulation comprises hydraulic fracturing the surface treatment fluid also comprises proppant.

As used herein, "porous network" describes the fractures, voids between proppant, and porous structure within the formation that is in fluid contact with the surface treatment fluid used in stimulating the hydrocarbon shale formation. Proppant prevents the formation from sealing the fractures when the pressure applied during hydraulic fracturing is reduced. The tight pore spaces between the grains of proppant and within the formation in fluid contact with the fractures function as capillaries allowing formation fluids to flow through. The tight porous structure within the formation can imbibe the surface treatment fluid exposes those surfaces to the surface treatment composition.

As used herein, "stimulation" refers to the methods used to release and recover hydrocarbons from hydrocarbon shale formations including drilling of the wellbore, hydraulic fracturing and Enhanced Oil Recovery. Stimulating the hydrocarbon shale formation increases the permeability of the shale formation to recover the formation fluids comprising hydrocarbons and brine (salt water).

As used herein, "persistent" is used in reference to the presence of chemisorbed passivator on the passivated surfaces of the formation. Even after thorough rinsing with water, the passivated surfaces induce spreading of water as a result of the persistent presence of adsorbed polar groups across the passivated surfaces.

As used herein, "HLB essentially equivalent to the oil in the hydrocarbon shale formation" describes how the conditioner comprising at least surfactants is optimized to enhance the desorption of oils from shale surfaces. The HLB is the Hydrophilic Lipophilic Balance of the oil. Optimum emulsion of the oil occurs when the HLB of the conditioner is essentially equivalent to the HLB of the oils.

As used herein "inhibits clay swelling" describes the effect the absorption and adsorption of quaternary monosaccharides and/or quaternary saccharides has on clays, thereby inhibiting formation damage due to clay swelling.

Figure 18A:
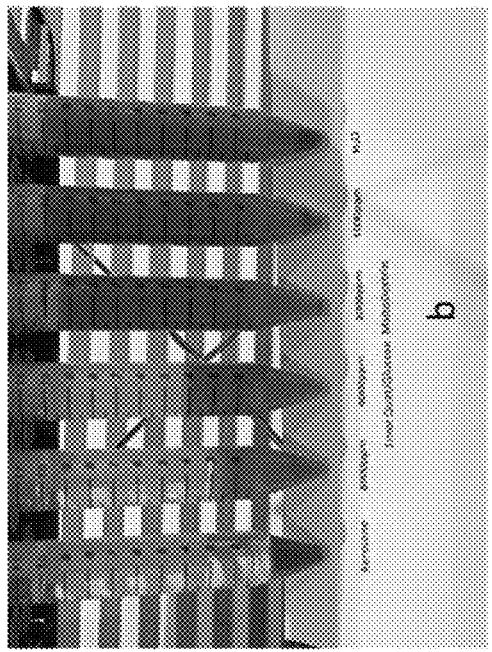
FIG. 18A, FIG. 18B, and FIG. 18C illustrate the synergistic effects resulting from combining QMS with QMD and the dramatic improvements achieved in inhibiting clay swelling.
Figure 18B:
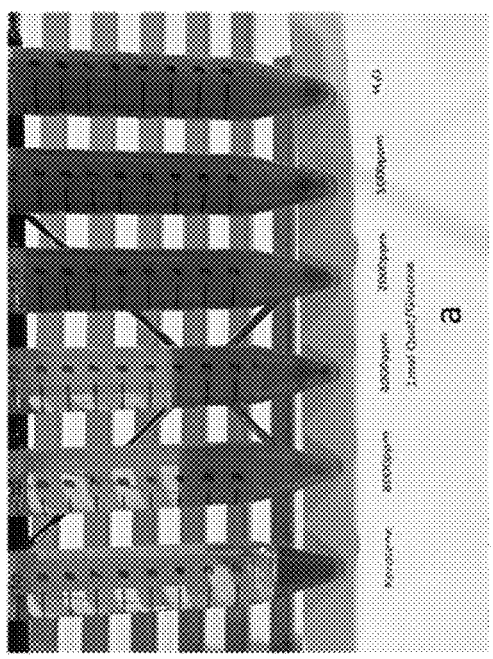
Figure 18C:
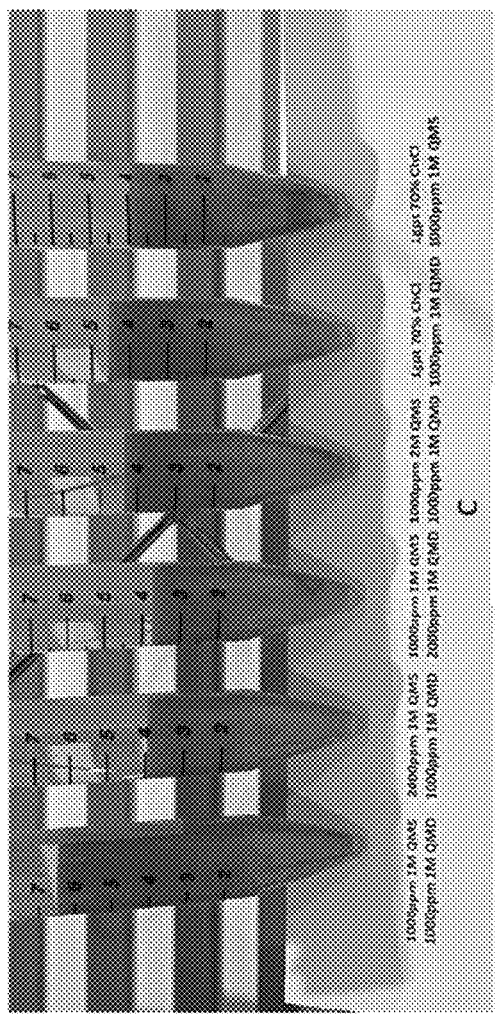

As used herein "synergistic" and "synergistically" are used to described the increased effect achieved by combining a quaternary monosaccharide and a quaternary saccharide having from about 2 to 20 monosaccharide molecules bonded together by glycosidic linkage compared to using either one alone. An example of synergistic effect is clearly illustrated in FIG. 18A, FIG. 18B and FIG. 18C. FIG. 18A and FIG. 18B which shows the inhibiting effects of quaternary monosaccharide (QMS) and quaternary saccharide (QMD) on montmorillonite clay using various concentrations and compared to controls (water and kerosene). At 2000 ppm of either QMS alone or QMD alone, only minor reductions in clay swelling are observed. However, when 1000 ppm of QMS is combined with 1000 ppm of QMD (FIG. 18C) the inhibitory effects on clay swelling are clearly evident resulting in an over 6-fold reduction in clay swelling compared to either QMD and QMS used alone at the same 2000 ppm concentration.

DETAILED DESCRIPTION OF EMBODIMENTS

The first embodiment of the invention is a method for increasing the permeability of a hydrocarbon shale formation during stimulation, the method comprising:
contacting the surfaces of a hydrocarbon shale formation with an effective amount of surface treatment composition, the composition comprising:
a passivator comprising at least one of a quaternary monosaccharide having from about 1 to 3 moles of quaternary functional groups, and a quaternary saccharide having a number of the monosaccharide molecules ranging from about 2 to 20 bonded together by glycosidic linkage with from 0.5 to 3 moles of quaternary functional groups per molecule of the monosaccharide;
a conditioner comprising at least one of a surfactant, a hydrotrope, and a terpene; and
water;
the weight percent ratio of the passivator and the conditioner ranges between 20:1 to 1:20 respectively;
allowing the surface treatment composition to condition and passivate the surfaces to provide passivated surfaces;
water contacting the passivated surfaces acquire a water-wet angle of contact; and,
wherein the passivator destabilizes the interface between the water and the passivated surfaces causing the water to spread further decreasing the angle of contact.

The composition in accordance with the first embodiment further comprising at least one of a monophosphate ester of monosaccharide and bisphosphate ester of monosaccharide.

The composition in accordance with the first embodiment can further comprise at least one phosphate diester of monosaccharides.

The method in accordance with the first embodiment, wherein the passivator inhibits clay swelling.

The method in accordance with the first embodiment, wherein stimulation of the hydrocarbon shale formation comprises hydraulic fracturing.

The method in accordance with the first embodiment, wherein stimulation comprises enhanced oil recovery.

The method in accordance with the first embodiment, wherein the angle of contact of the spreading water essentially approaches zero.

The method in accordance with the first embodiment, wherein the angle of contact of the spreading water decreases to less than 30°, preferably less than 20°, and most preferred less than 10°.

The composition in accordance with the first embodiment, wherein the weight percent ratio of passivator and conditioner ranges between 20:1 and 1:1 respectively.

The composition in accordance with the first embodiment, wherein the conditioner has an HLB essentially equivalent to the oil in the hydrocarbon shale formation.

The second embodiment of the invention is a ready-to-use surface treatment composition for increasing the permeability of a hydrocarbon shale formation during stimulation, the composition comprising:
a passivator comprising at least one of a quaternary monosaccharide having from about 1 to 3 moles of quaternary functional groups, and a quaternary saccharide having a number of the monosaccharide molecules ranging from about 2 to 20 bonded together by glycosidic linkage with from 0.5 to 3 moles of quaternary functional groups per molecule of the monosaccharide;
a conditioner comprising at least one of a surfactant, a hydrotrope, and a terpene; and
solvent, and
wherein the weight percent ratio of the passivator and the conditioner ranges between 20:1 to 1:20 respectively.

The composition in accordance with the second embodiment further comprising at least one of a monophosphate ester of monosaccharide, a bisphosphate ester of monosaccharide and phosphate diester of monosaccharides.

The composition in accordance with the second embodiment, wherein the weight percent ratio of passivator and conditioner can range between 20:1 and 1:1 respectively.

The composition in accordance with the second embodiment, wherein the passivator inhibits clay swelling.

The composition in accordance with the second embodiment, wherein the conditioner can have an HLB essentially equivalent to the oil in the hydrocarbon shale formation.

The third embodiment of the invention is a granular solid surface treatment composition for increasing the permeability of a hydrocarbon shale formation during hydraulic fracturing, the composition comprising:
A passivator comprising at least one of a quaternary monosaccharide having from about 1 to 3 moles of quaternary functional groups, and a quaternary saccharide having a number of the monosaccharide molecules ranging from about 2 to 20 bonded together by glycosidic linkage with from 0.5 to 3 moles of quaternary functional groups per molecule of the monosaccharide;
a conditioner comprising at least one of a surfactant, and a hydrotrope;
the weight percent ratio of the passivator and the conditioner ranges between 20:1 to 1:20 respectively, and
wherein the granules are encapsulated with a water insoluble polymer membrane.

The composition in accordance with the third embodiment further comprising at least one of a monophosphate ester of monosaccharide, a bisphosphate ester of monosaccharide and phosphate diester of monosaccharides.

The composition in accordance with the third embodiment, wherein the weight percent ratio of the passivator and the conditioner can range between 20:1 and 1:1 respectively.

The composition in accordance with the third embodiment can further comprise at least one phosphate diester of monosaccharides.

The composition in accordance with the third embodiment, wherein the conditioner can have an HLB essentially equivalent to the oil in the hydrocarbon shale formation.

The surface treatment composition works synergistically to first condition then passivate the surfaces of the porous network to provide passivated surfaces.

Without being limited by any theory, it is believed that surface conditioning is the result of surfactant working synergistically with the passivator to desorb the oils from the formation surfaces. The high charge density of the passivators (as well as addition of chelants etc.), impose competing reactions against the weaker functional groups on the oil. Oil that is adhered to the formation surfaces is displaces and dispersed. The passivator chemically adsorbs to the formation surfaces exposing a hydrophilic (polar) end to form passivated surfaces. The passivated surfaces inhibit resorption of oils after residual treatment is removed during flowback and production by adsorbing a barrier film of water.

As the surface is conditioned from the oil displacement, the passivators chemically adsorb to cationic and/or anionic charges embedded in the rock matrix. The high charge density of the passivator forms strong bonds with the surfaces and extends a polar (hydrophilic) end. Water adsorbs to the polar ends forming a barrier film, thereby inhibiting oil adsorption. The more area on the surface covered with the polar groups, the higher the wetting rate.

The conditioner can be optimized to maximize the desorption of the oils from the surface and increase the surface area exposed to the passivator. Optimization is done by blending surfactants to obtain an HLB (hydrophilic lipophilic balance) essentially equivalent to the oil being desorbed from the surfaces. Also, low surface tension and wetting enhance distribution of the surface treatment composition throughout the porous network.

Figure 19:
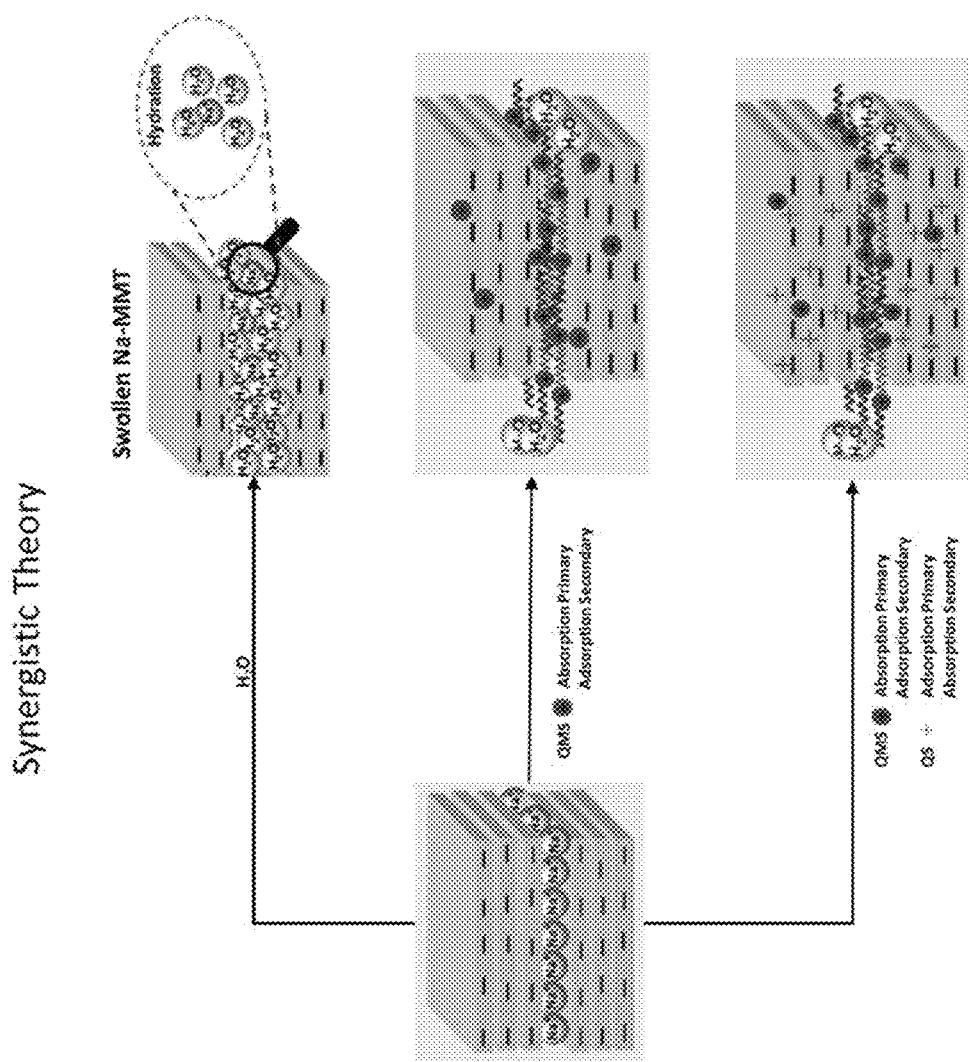
FIG. 19 illustrates the proposed theory providing the synergistic effects demonstrated in FIG. 18. Water hydration of the clay strata causes dissolution of the cations, disrupting the charge balance in the clay. Quaternary monosaccharides and lower molecular weight quaternary saccharides (and/or choline chloride) absorb into the clay to re-establish a balance in charge distribution (replacing the dislocated mineral cations). Furthermore, surface adsorption of QMS and especially the higher molecular weight QMD onto the anionic surfaces further stabilizes the charge distribution in the clay, thereby inhibiting clay swelling.

Without being limited to any theory, water absorption hydrates the ion exchangeable cations in the clay. The dissolution of cations destabilizes the charge distribution in the clay causing the clay to swell. Quaternary monosaccharides (QMS) and low molecular weight quaternary saccharides (QS) are absorbed into the clay strata along with water, followed by adsorption to the clay's internal surfaces balances the charge distribution resulting from the dislocated ion exchangeable cations, thereby inhibiting the swelling of the clay and resulting formation damage. Additionally, adsorption of higher molecular weight quaternary saccharides onto the anionic surfaces of the clay works synergistically with the absorbed quaternary monosaccharide and quaternary saccharides to stabilize the charge distribution of the clay. An example of synergistic effect is clearly illustrated in FIG. 18A and FIG. 18B showing the inhibiting effects of quaternary monosaccharide (QMS) and quaternary saccharide (QMD) on montmorillonite clay using various concentrations compared to controls (water and kerosene). At 2000 ppm of either QMS alone or QMD alone, only minor reductions in clay swelling are observed. However, when 1000 ppm of QMS is combined with 1000 ppm of QMD (FIG. 18C), the inhibitory effects on clay swelling are clearly evident and striking. Further modifications such as increasing the charge density on the QMS (i.e. 2 mol quaternary functionality) further enhanced the synergistic effects while keeping the concentrations unchanged. The repeated illustrations on the swelling inhibiting effects when using low molecular weight quaternary inhibitors (e.g. QMS and choline chloride) combined with higher molecular weight QMD support the theory of synergistic effects resulting from absorption and adsorption within and on the clay surfaces respectively. FIG. 19 illustrates the mechanisms proposed to support the theory used to describe the resulting synergistic inhibiting effect on clay swelling. FIG. 19 further illustrates the proposed theory.

The ratio of QMS to QS ranges from about 1:9 to 9:1 respectively.

A synergistic effect can be measured using the clay swelling method demonstrated. The improvements in the inhibitor effect on clay is determined using the equation:

$$SI=[(V_w-V_n) \div (V_w-V_k)] \times 100$$

Where, $V_w$ (ml) is the volume of swollen clay in water; $V_n$ (ml) is the volume of swollen clay in the Treated water (i.e QMS); $V_k$ (ml) is the volume of clay in kerosene.

By comparing the differences in volume resulting from the inhibitor(s) used alone and in combination, the improved inhibitory effects resulting from the synergistic effect can be determined. For example, as illustrated, both 1 mol QMS and 1 mol QMD at 2000 ppm demonstrated approximately at 5.2% reduction in swelling based on the reduction in volume.

$$SI=(10\ ml-9.5\ ml) \div (10\ ml-0.5\ ml) \times 100$$

$$SI=5.2\%$$

The sample treated with 1000 ppm 1 mol QMS and 1000 ppm 1 mol QMD demonstrated the following swelling inhibition (SI):

$$SI=(10\ ml-6.5\ ml) \div (10\ ml-0.5\ ml) \times 100$$

$$SI=36.8\%$$

The synergistic effect achieved by combining QMS and QMD is calculated as follows:

$$\text{Synergistic Effect}=[\% \text{ SI (combined inhibitor)} \div \% \text{ SI (single inhibitor)}] \times 100$$

$$\text{Synergistic Effect}=(36.8 \div 5.2) \times 100$$

$$\text{Synergistic Effect}=707\% \text{ reduction in swelling}$$

Without being limited to any theory, the data clearly illustrates that the structure (molecular weight) and charge density of the quaternary saccharides play a crucial role in the performance of the inhibitors and passivators. Low cost, readily available and sustainable plant-based saccharides can be used to produce the quaternary monosaccharide and quaternary saccharides of the invention. A charge density of the quaternary saccharides are based on an equivalence of 0.5 moles to 3 moles of quaternary functionality per mole (or molecule) of monosaccharide. The experimental data demonstrates that this level of charge density is required to achieve the desired effects at the concentrations of clay swelling inhibitor applied. Inhibition of clay swelling can be achieved by addition of an effective amount of at least one of a quaternary monosaccharide and quaternary saccharide having from about 2 to 20 monosaccharide molecules bonded together by glycosidic linkage. An effective amount can range from about 1,000 to 20,000 ppm, preferably 2,000 to 10,000 ppm and most preferred 2,000 to 8,000 ppm.

Stimulation of hydrocarbon shale formations comprise drilling, hydraulic fracturing (fracking) or enhanced oil recovery (tertiary recovery). During these stimulating operations, stimulating fluid comprising at least water, chemicals, and in the case of fracking proppant is treated with a surface treatment composition to make a surface treatment fluid. The surface treatment fluid is applied into the shale formation at pressures sufficient to force the surface treatment fluid into the fractures and porous network within the formation. The surface treatment composition then conditions and passivates the surfaces in fluid contact with the porous network to form passivated surfaces.

Passivator

The structure of the passivator needs to incorporate several features to ensure performance efficacy. These features include: a high charge density, ability to chemisorb with cationic or anionic charges on the rock surfaces, and short organic end (tail) with polar group(s) that do not react with polyvalent cations and anions in the water of the formation fluid. Nonionic polar groups exemplified by hydroxyl and carbonyl groups are preferred over ionic groups such as carboxyl and amine groups.

Large organic tails (long carbon chains) with or without reactive functional groups can induce removal of the passivator from the formation surface, shortening the life of the passive layer and subsequent long term (persistent) hydrophilic surface.

Passivators comprise at least one of a quaternary monosaccharide having from about 1 to 3 moles of quaternary functional groups, and a quaternary saccharide having a number of the monosaccharide molecules ranging from about 2 to 20 bonded together by glycosidic linkage with from 0.5 to 3 moles of quaternary functional groups per molecule of the monosaccharide. Passivators can further comprise at least one of a monophosphate ester of monosaccharide and a bisphosphate ester of monosaccharide (i.e. a monosaccharide monophosphate ester, a monosaccharide bisphosphate ester or any combination thereof). For illustration, non-limiting examples of monophosphate ester and bisphosphate esters of monosaccharides include:

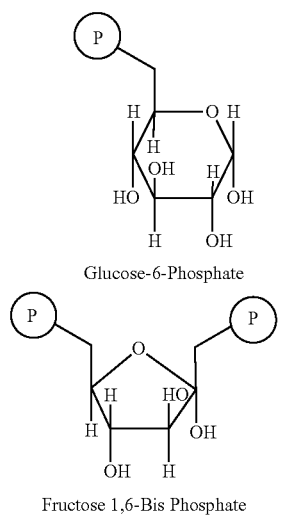

Glucose-6-Phosphate

Fructose 1,6-Bis Phosphate

Where "P" represents a phosphate ester.

For illustration, non-limiting examples of quaternary monosaccharides include:

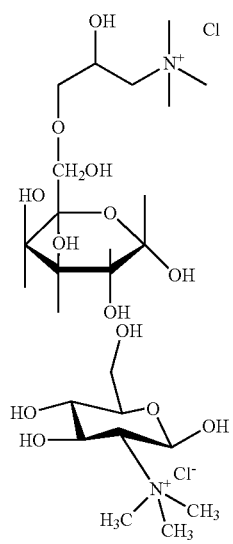

The quaternary monosaccharides comprise monosaccharides having from about 1 to 3 moles of quaternary functional groups. The quaternary functional groups can comprise ammonium or phosphonium functionality. The number of substituted quaternary functional groups can vary to achieve the desired balance between charge density and hydrophilicity of the remaining polar end (tail). Variations in the quaternary moiety can and often due occur as a result in limitations during manufacturing. Therefore, the disclosed relative range of quaternary moiety are for example only and are intended to represent average values and are not intended to limit the scope of the invention.

Saccharides comprising from about 2 to 20 monosaccharide molecules bonded together by glycosidic linkage are exemplified by the following non-limiting examples:

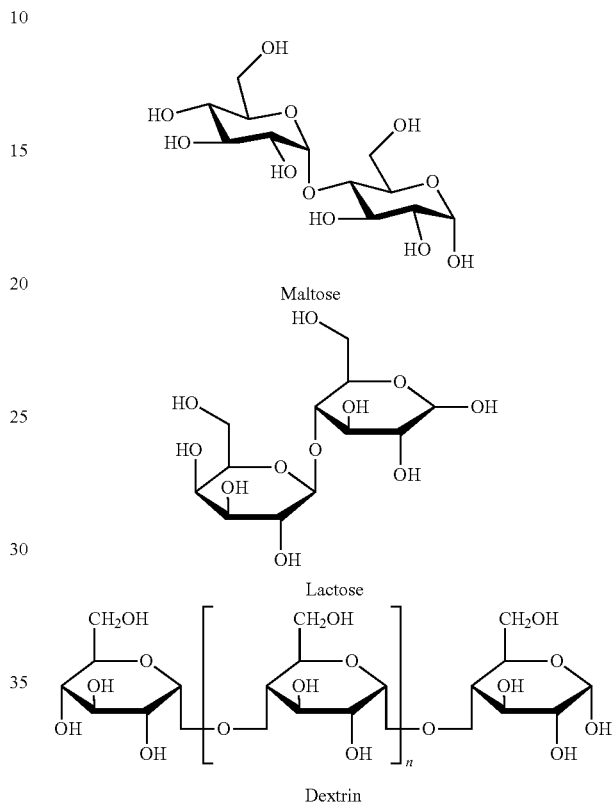

Maltose

Lactose

Dextrin

Dextrin's comprise repeating "n" groups of various lengths. Preferred dextrin's comprise repeating "n" groups ranging from about $2<n<20$. Preferred dextrin comprises maltodextrin. Maltodextrin is low cost and readily available in liquid and solid forms from Cargill Corporation.

The quaternary saccharides comprise saccharides having from about 0.5 to 3 moles of quaternary functional groups, more preferred about 1 to 3 moles of quaternary functional groups. The quaternary functional groups can comprise ammonium or phosphonium functionality. The number of substituted quaternary functional groups can vary to achieve the desired balance between charge density and hydrophilicity of the remaining polar end (tail). Variations in the quaternary moiety can and often due occur as a result in limitations during manufacturing. Therefore, the disclosed relative range of quaternary moiety are for example only and are intended to represent average values and are not intended to limit the scope of the invention.

As is well-known, natural clays exemplified by montmorillonite (MMT) takes on high net negative charges because of isomorphous substitution in their octahedral layers. To ensure charge balance, cations in the interlayers, such as $Na^+$, $Ca^{2+}$, etc, compensate the negative charges. The hydration of cations in the interlayers results in the expansion of MMT. Upon addition of quaternary saccharides, quaternary ammonium cations absorb and intercalate the interlayers of MMT via cation exchange reaction. Herein, electrostatic attraction and hydrogen bonding are regarded as the multiple driving forces of adsorption. The negative charges of Na-MMT are neutralized by positive charges in quaternary monosaccharides, resulting in the collapse of the diffuse double layer and reduction in repulsive interaction of crystal grains.

Non-limiting examples of monosaccharides for producing at least one of a monophosphate ester of monosaccharide and a bisphosphate ester of monosaccharide include: glucose, fructose, galatose, talose, iodose, gulose, mannose, altrose, allose, lyxose, xylose, arabinose, ribose, erythrose, glyceraldehyde, threose, glucosamine and the like. More preferably, the monosaccharide is glucose or fructose. Most preferably, the monosaccharide is glucose based on superior temperature resistance compared to the other monosaccharides when utilized in the present invention.

Non-limiting examples of preferred monophosphate esters and bisphosphate esters of monosaccharides include: glucose-1-phosphate, glucose 1,6-bisphosphate, fructose 1,6-bisphosphate, glycerol phosphate, erythrose 4-phosphate, D-ribose-5-phosphate, dihydroxyacetone phosphate, glucose 6-phosphate.

Preferred passivators comprise at least one of a quaternary monosaccharide having from about 1 to 3 moles of quaternary functional groups, and a quaternary saccharide having a number of the monosaccharide molecules ranging from about 2 to 20 bonded together by glycosidic linkage with from 0.5 to 3 moles of quaternary functional groups per molecule of the monosaccharide. The high concentration of polar groups increases the hydrophilic nature of the passivated shale formation. The wetting rate which is the time required for the water to spread across the passivated surfaces is substantially reduced with increased surface area covered with the passivators polar groups.

Passivators can further comprise at least one of a monophosphate ester of monosaccharide, a bisphosphate ester of monosaccharide and a phosphate diesters of monosaccharides (i.e. a monosaccharide monophosphate ester, a monosaccharide bisphosphate ester, a phosphate diester of monosaccharide or any combination thereof).

For illustration, non-limiting example of a phosphate diester of monosaccharide is glucose phosphate diester

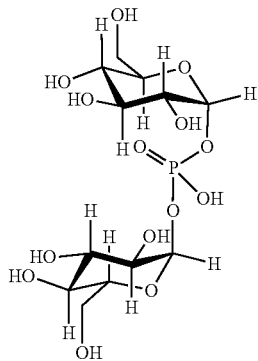

Phosphate ester passivators can be manufactured using inexpensive sweeteners exemplified by high fructose corn syrup and dextrose (glucose) syrups using phosphating agents such as triphosphoric acid and pyrophosphoric acid. Methods for producing phosphate esters are well established in literature and to those skilled in the art.

Quaternary based passivators can be produced using inexpensive sweeteners exemplified by high fructose corn syrup, dextrose (glucose) syrups, dextrose powder, maltodextrin liquid or powder etc. and reacting them with quaternizing agents.

Non-limiting examples of suitable ammonium based quaternizing agents include: (3-chloro-2-hydroxypropyltrimethylammonium chloride), (2,3-epoxypropyltrimethylammonium chloride), (3-chloro-2-hydroxypropyldimethyldodecylammonium chloride), (3-chloro-2-hydroxypropylcocoalkyldimethylammonium chloride) and (3-chloro-2-hydroxypropyldimethylstearylammonium chloride).

The quaternization is the chemical conversion of the quaternizing agent from its stable chlorohydrin form to its corresponding reactive epoxide form. This conversion is achieved by reacting equimolar quantities of alkali with the chlorohydrin. The resulting epoxide can then further react, again under alkaline conditions, with the hydroxyl or amino groups on the monosaccharide substrate. The resulting product is a substrate with a chemically bound quaternary ammonium group, which imparts a cationic charge. Quaternizing agents from a stable chlorohydrin form provide the capability to effectively control the charge density of the resulting QMS and QS. Furthermore, producing synergistic compositions comprising QMS and QS can be achieved by producing the QMS and QS independently then combining them together at the desired ratio, or combining the monosaccharide and saccharide having from about 2 to 20 monosaccharides bonded together by glycosidic linkage together then reacting them in the presence of the quaternizing agent. This is especially easier and desired when synthesizing QMS and/or QS having from 1-3 moles of quaternary functionality per monosaccharide molecule (or mole of monosaccharide).

Passivators provide several functions when applied to the formations porous network. The passivator functional groups impart a high charge density forming a competing reaction with the weaker functional groups on the oil. The strong competing reaction imposed by the passivator along with the conditioners displace and disperse the oil from the formation's surface exposing the formation substrate (rock). The passivator then chemisorbs to opposing charges exposed on the surface, exposing a polar hydrophilic end toward the formation fluid. Water applied to the passivated surfaces does not establish an equilibrium thereby forming a stable dome (bead) of water. Instead, the water spreads, diminishing the contact angle over time until the contact angle essentially approaches zero. The chemisorbed film remains persistent extending the hydrophilic nature of the surface for extended periods, unlike that of surfactant treatments that desorb and are eventually removed (eluted) from the formation.

Conditioner

The surface treatment composition according to one aspect of the present invention contains a conditioner comprising at least one of a surfactant, a hydrotrope and terpene (i.e., a surfactant, a hydrotrope, a terpene in any combination thereof). The surfactant, hydrotrope and terpene or mixtures thereof contribute to the removal of physically adsorbed oil and oil displaced (desorbed) by the passivator. For example, surfactants disperse and remove hydrocarbon residues, reduce surface tension to aid penetration of pores and fissures, and work synergistically with the passivator to disperse the hydrocarbons desorbed by the passivator.

The surfactant can be anionic, nonionic, cationic and/or amphoteric. Mixtures of different surfactants are known to work synergistically. Preferred surfactants are anionic and nonionic.

The conditioner can be optimized to maximize the desorption of the oils from the surface and increase the surface area exposed to the passivator. Optimization is done by blending surfactants to obtain an HLB (hydrophilic lipophilic balance) essentially equivalent to the oil in the hydrocarbon shale formation.

The conditioner can be a mixture or comprise an emulsion comprising at least one of a microemulsion and a nanoemulsion.

Non-limiting examples of the anionic surfactant include, for example, alkyl diphenyl ether disulphonate, polyoxyethylene alkyl ether acetic acid, polyoxyethylene alkyl sulfate ester, alkyl sulfate ester, polyoxyethylene alkyl ether sulfuric acid, alkyl ether sulfuric acid, alkylbenzene sulfonic acid, alkyl phosphate ester, polyoxyethylene alkyl phosphate ester, polyoxyethylene sulfosuccinic acid, alkyl sulfosuccinic acid, alkylnaphthalene sulfonic acid, alkyldiphenyl ether disulfonic acid, and salts thereof, and the like. Among the above, alkyl diphenyl ether disulphonate, alkyl phosphate ester, alkyl sulfate ester, polyoxyethylene alkyl sulfate ester, polyoxyethylene alkyl ether sulfuric acid, alkyl ether sulfuric acid, alkylbenzene sulfonic acid, polyoxyethylene sulfosuccinic acid, and alkyl sulfosuccinic acid are preferable.

Non-limiting examples of the nonionic surfactant include alkyl betaine, alkylamine oxide, polyoxyethylene alkyl ether, polyoxyalkylene alkyl ether, sorbitan fatty acid ester, glycerol fatty acid ester, polyoxyethylene fatty acid ester, polyoxyethylene alkylamine, alkyl alkanolamide, and the like. The other examples of the nonionic surfactant include polyglycerol-based surfactants. Examples of the polyglycerol-based surfactants include polyglycerol lauryl ester, polyglycerol lauryl ether, and the like. As the nonionic surfactant, polyoxyethylene alkyl ether, polyoxyalkylene alkyl ether, and the polyglycerol-based surfactants are preferable, and polyglycerol lauryl ester and polyglycerol lauryl ether are more preferable. One type of the examples of the nonionic surfactants mentioned above may be used alone or two or more types thereof may be used in combination.

Non-limiting examples of cationic surfactants include alkyltrimethylammonium chloride, dialkyldimethylammonium chloride, distearyldimethylammonium chloride, ditallowdimethylammonium chloride, alkyldimethylbenzylammonium chloride, tributyltetradecyl phosphonium chloride.

Non-limiting examples of amphoteric surfactants include Alkylamidopropylamine N-oxide, Alkyldimethylamine N-oxide, Alkylbetaine, Alkylamidopropylbetaine, Cocamidopropyl betaine, Cocoamphoacetate and Cocoamphodiacetate.

Non-limiting examples of hydrotropes include urea, tosylate, cumene sulfonate, toluene sulfonate and xylene sulfonate.

Non-limiting examples of terpenes include terpineol, limonene, myrcene, linalool, pinene, and carvone.

Silicate Adsorbent

Silicate Adsorbents have a cationic charge that adsorbs to the anionic surfaces of the formation imparting a hydrophilic surface.

Non-limiting examples of preferred adsorbents include: Choline chloride, 2,3-dihydroxypropyl trimethylammonium chloride, monoethanolamine, diethanolamine, 2-amino-2-methyl-1-propanol chlorhexidine, biguanide, chlorguanide, poly(hexamethylene) biguanide, glucosamine, glucosamine sulfate and chitosan.

[Solvent]

The surface treatment composition according to one aspect of the present invention essentially contains water as a solvent. The solvent has a function of dispersing or dissolving each component. The solvent more preferably contains only water. The solvent may be a mixed solvent containing water and an organic solvent for dispersion or dissolution of each component. In this case, suitable organic solvents include acetone, acetonitrile, ethanol, methanol, isopropanol, glycerol, ethylene glycol, propylene glycol, glycol ethers (i.e. ethylene glycol mono butyl ether) and the like, which are organic solvents miscible with water. These organic solvents may be used without being mixed with water, and may be mixed with water after each component is dispersed or dissolved. These organic solvents can be used alone or in combination of two or more types thereof.

The surface treatment composition can be formulated in advance and then applied during the process of stimulating the hydrocarbon shale formation, or conditioners and passivators can be applied independently to the water used to stimulate the formation.

A solid granular surface treatment composition can be produced by combining at least one of a passivator and a conditioner with a solvent to form a surface treatment solution, mixing the surface treatment solution, then drying the surface treatment solution to form a solid surface treatment composition.

The drying can be completed using established methods including spray drying, falling film drying and the like. Particle size can be optimized to correlate with the size of the proppant if desired by adjusting the spray drying system and grinding and sieving flakes and larger particle sizes.

The granules can be encapsulated to produce a membrane to provide a delayed release within the formation. One example of suitable method of encapsulating is disclosed in U.S. Pat. No. 7,179,485 Scheider et al. wherein a polyurethane vinyl polymer and solid micron sized particles are combined to form a water insoluble membrane that is water permeable.

pH

The water (i.e. fracturing fluid) comprising the surface treatment composition has a pH of 6 or more. In one aspect of the invention, the water has a pH of 12 or less. Preferably the pH of the water has a pH of 7 or more and less than 11.

Other Additives

Chelant can be incorporated into the surface treatment composition or be applied to the water used for the fracturing fluid or tertiary recovery. The term chelant is used to describe both chelant and sequestrant since sequestrants can function as chelants if applied at the stoichiometric concentrations. Chelants can complex with polyvalent cations that are involved with ion binding between the oil and formation surface as well as potentially interact with the passivator's functional group. Excess passivator can be applied to offset these potential interferences caused by polyvalent cations, however chelants/sequestrants can effectively neutralize their interferences.

Examples of the chelating agent having a phosphonic acid group (hereinafter, also referred to as "phosphonic acid-based chelating agent") include 1-hydroxyethylidene-1,1-diphosphonic acid (HEDP), nitrilotris(methylene phosphonic acid) (ATMP), ethylenediamine tetra(methylene phosphonic acid) (EDTMP), sodium hexametaphosphate, or 2-phosphonobutane-1,2,4-tricarboxylic acid (PBTC).

Examples of the carboxylic acid-based chelating agent include ethylenediaminetetraacetic acid, sodium ethylenediaminetetraacetate, nitrilotriacetic acid, sodium nitrilotriacetate, ammonium nitrilotriacetate, hydroxyethylethylenediaminetriacetic acid, sodium hydroxy ethylethylenediaminetriacetate, diethylenetriaminepentaacetic acid, sodium diethylenetriaminepentaacetate, triethylenetetraminehexaacetic acid, and sodium triethylenetetraminehexaacetate. One type of the chelating agents can be used alone or two or more types thereof can be used in combination.

The concentration of passivator in the water used to treat the surfaces within the porous network of the formation ranges between 50 to 10000 ppm, preferably 75 to 5000 ppm and most preferred 100 to 4000 ppm.

The concentration of quaternary monosaccharide and/or quaternary saccharide passivator used to inhibit clay swelling can range from 1,000 to 20,000 ppm, preferably 2,000 to 10,000 ppm and most preferred 2,000 to 8,000 ppm.

The concentration of conditioner in the water used to treat the surfaces within the porous network of the formation ranges between 50 to 5000 ppm, preferably 75 to 4500 ppm and most preferred 100 to 4000 ppm.

The initial (time=0 s) angle of contact of water on the sample core surface conditioned and passivated by the surface treatment composition is <75°, more preferred <60° and most preferred <45°. After the initial contact between the water and the passivated surfaces, the angle of contact will decrease with time. When the surface has been treated with an effective amount of surface treatment composition, the angle of contact will decrease to <30°, more preferred <20° and most preferred <10°. The time required to decrease the angle of contact is the wetting rate. The wetting rate to achieve these angles of contact is <5 minutes, more preferred <4 minutes and most preferred <3 minutes.

Surface Treatment Compositions

Surface treatment compositions can be produced by adding the passivator and conditioner separately to water to produce a surface treatment fluid for use during stimulation of the hydrocarbon shale formation. Furthermore, silicate adsorbent, chelants, and other chemicals can be added to the surface treatment fluid.

A "ready-to-use" surface treatment composition can be produced by adding the passivator and conditioner to a solvent and mixing to form a surface treatment composition. Other additives can be added at this time such as silicate adsorbent, chelant and the like. The resulting surface treatment composition is packaged for storage and transport.

Encapsulated Surface Treatment Compositions

Encapsulated surface treatment composition can be produced by applying a "ready to use" surface treatment composition to a dryer such as a spray drier to form a granular surface treatment composition of desired particle size. Methods and equipment for producing granules and controlling the particles size is well established and readily commercially available. Once the granules have been produced, the granules are suspending in a fluidized bed system and a water insoluble polymer is sprayed onto the suspended granules resulting in an encapsulated surface treatment composition.

One example of suitable method of encapsulating is disclosed in U.S. Pat. No. 7,179,485 Scheider et al. wherein a polyurethane vinyl polymer and solid micron sized particles are combined to form a water insoluble membrane that is water permeable.

The encapsulated surface treatment composition can be applied along with the proppant during hydraulic fracturing, thereby providing a target release of localized high concentrations within the porous network of the shale formation.

Without being bound by any theory, it is believed that the water insoluble polymer membrane encapsulating the granular surface treatment composition is temperature activated. The granular surface treatment composition within the encapsulation is isolated from the water while being transported by the surface treatment fluid to the porous network. Once the encapsulated surface treatment composition is established within the porous network, the heat from the formation activates the encapsulating membrane exposing the granules to the water. The water dissolves the granules and releases the surface treatment composition within the porous network to provide localized high concentrations of surface treatment composition. Concentration gradients and anticipated convection forces distribute the treatment throughout the porous network.

An advantage to using the encapsulated surface treatment composition is that it avoids having to treat all of the water used in hydraulic fracturing. Once the proppant and encapsulated surface treatment composition is embedded within the formation, the elevation in temperature results in the encapsulation decomposing and exposing the granular surface treatment composition to the remaining water within the porous network releasing localized high concentrations of the surface treatment composition. Targeted placement of the treatment provides the ability to deliver high concentrations of treatment to the porous network more cost effectively.

Quaternary Monosaccharide and Saccharide Synthesis

A quaternary monosaccharide comprising approximately a 1 mol quaternary glucose was produced by combining 96.5 ml filtered RO water with 37.5 ml (3-chloro-2-hydroxypropyl) trimethylammonium chloride (60%) and 11 ml (50%) sodium hydroxide and mixing using a magnetic stirrer. Then 25 g of dextrose (glucose) was added and allowed to mix overnight.

A quaternary monosaccharide comprising approximately a 2 mol quaternary glucose was produced by combining 122.36 g filtered RO water with 75.1 ml (3-chloro-2-hydroxypropyl) trimethylammonium chloride (60%) and 14.8 ml (50%) sodium hydroxide and mixing using a magnetic stirrer. Then 25 g of dextrose (glucose) was added and allowed to mix overnight.

A quaternary monosaccharide comprising approximately a 3 mol quaternary glucose was produced by combining 166 ml filtered RO water with 112.5 ml (3-chloro-2-hydroxypropyl) trimethylammonium chloride (60%) and 23.8 ml (50%) sodium hydroxide and mixing using a magnetic stirrer. Then 25 g of dextrose (glucose) was added and allowed to mix overnight.

A quaternary saccharide comprising approximately a 1 mol quaternary/glucose unit on maltodextrin was produced by combining 90.71 g filtered RO water with 37.5 ml (3-chloro-2-hydroxypropyl) trimethylammonium chloride (60%) and 7.4 ml (50%) sodium hydroxide and mixing using a magnetic stirrer. Then 25 g of maltodextrin was added and allowed to mix overnight.

Clay Swelling Test

Samples were prepared using 15 ml conical bottom Eppendorf tubes by treating water with various concentrations of the treatments to obtain approximately 10 ml of liquid per sample. Montmorillonite clay was dried at 350° F. for approximately 60 minutes. Clay samples were weighed to obtain 0.50 g, applied to the various liquid samples and vortexed for 60 s. Control samples were prepared using kerosene only and water only to compare the variances in swelling.

Swelling Inhibition (SI) was determined using the following equation:

$$SI=[(V_w-V_n)+(V_w-V_k)]\times 100$$

Where, $V_w$ (ml) is the volume of swollen clay in water; $V_n$ (ml) is the volume of swollen clay in Treated water (i.e. QMS); $V_k$ (ml) is the volume of clay in kerosene.

Result of Swelling Test

FIG. 10, FIG. 11, FIG. 12 and FIG. 13 illustrate the inhibition of the various quaternary monosaccharides and quaternary saccharides based on their respective moles of quaternary functionality, glucose content and concentrations.

Wetting Test.

FIG. 1 and FIG. 2 illustrate the angle of contact using commercially available surfactants and surfactant blends comprising terpene at concentrations ranging from 200 ppm, 1000 ppm and 2000 ppm. The test performed used Bakken core samples saturated with Bakken oil and should therefore be comparable to the following testing conducted by the inventor. Even at concentrations of 2000 ppm, the best performing treatment failed to achieve an angle of contact of 30°.

Bakken formation core samples were obtained from the North Dakota Geological Society. The cores were soaked in Bakken oil and aged while heating from 4-15 months. After saturating the core samples with oil, the samples were cooled and excess oil was removed prior to testing.

General Testing Model

The angle of contact of prepared core samples was performed by placing a water droplet using a 100 µl pipettor on the sample and photographing the water bead to obtain the relative angle of contact before treatment. Fresh water as well as Bakken produced water was used to assess the relative angle of contact.

Prepared core samples were placed in 125 ml jars containing 100 ml of water comprising either the surface treatment compositions of the invention or surfactant-based treatments. All samples were heated to approximately 200° F. and allowed to react at temperature for 18-21 days. The core samples were allowed to cool, then the lids were removed and the samples were initially rinsed with fresh water to displace the accumulated oil from the jars. Then the core samples were retrieved, thoroughly rinsed with water to remove loosely adhered particulate and residual treatment, lightly dabbed with a paper towel, then allowed to air dry.

In real-world practice the formation will never be dry. However, in order to demonstrate the passivator provides a persistent effect, not just when the treatment is present in the water, the samples were thoroughly rinsed to remove any treatment not chemically adsorbed, dabbed with a paper towel to remove beads of water then allowed to dry. The remaining effect on contact angle reduction due to destabilized interface between the water droplet and core surface is the result of chemisorbed passivator.

A water droplet using a 100 µl pipettor was placed on the processed core sample to form a bead of water. The sample was then photographed to observe the relative angle of contact.

Figure 9:
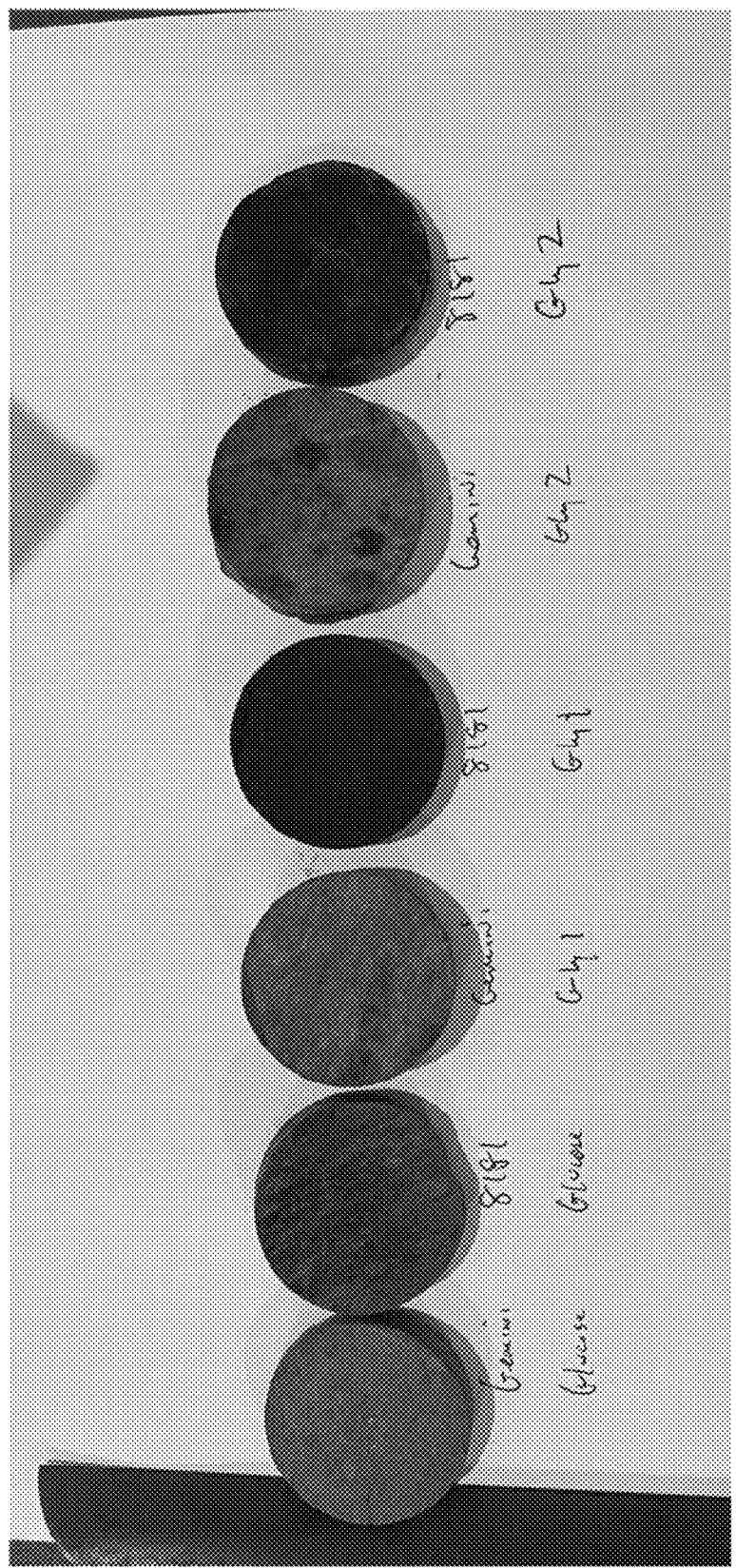
FIG. 9 compares different passivators at the same use concentration using two different conditioners (surfactants). The glucose based passivator desorbed more oil resulting in processed core samples appearing lighter in color. A subsequent wetting test demonstrated the glucose treated samples induced water spreading resulting in an angle of contact that quickly decreased, essentially approaching zero.
Figure 10:
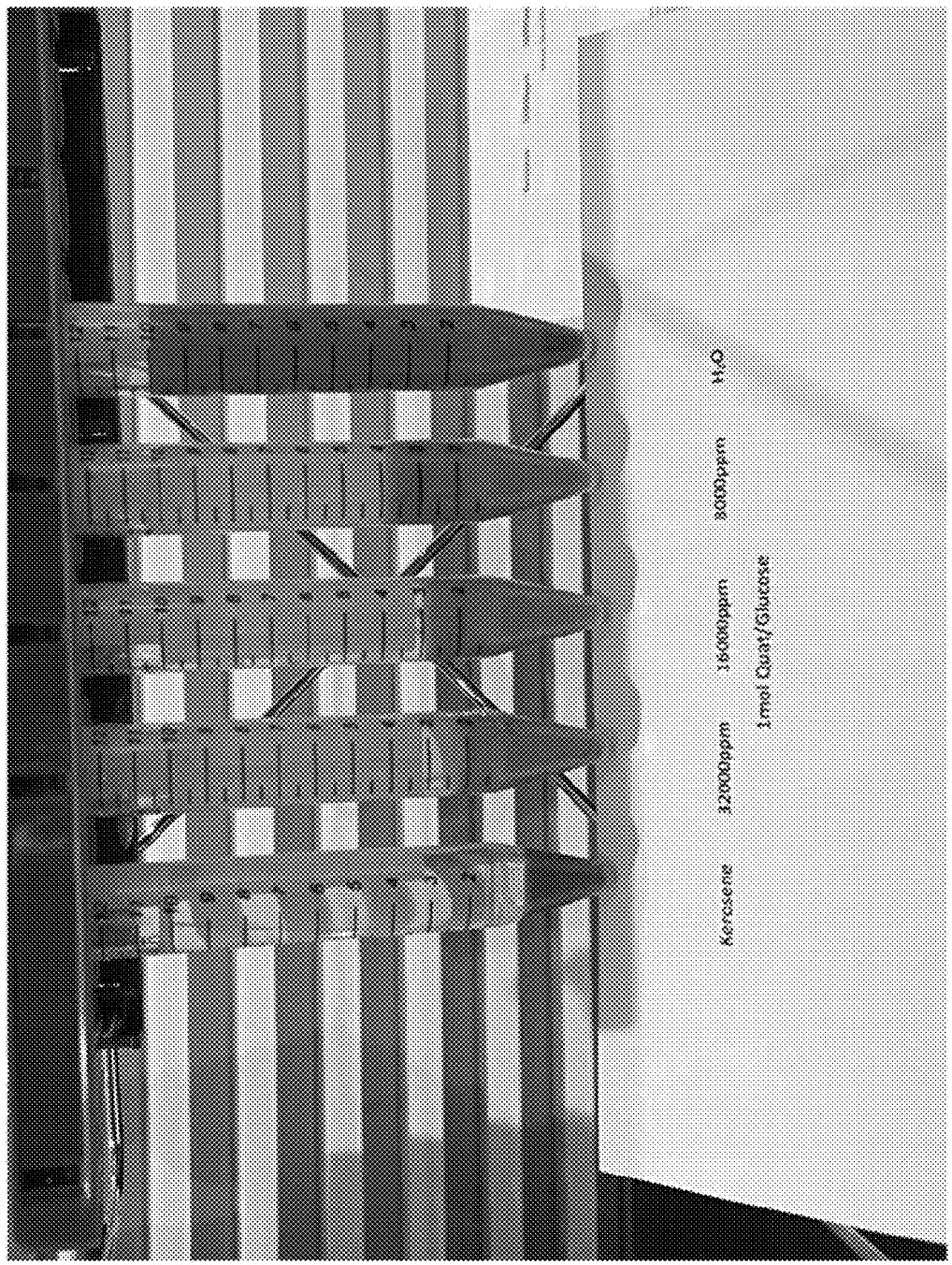
FIG. 10 illustrate montmorillonite clay samples treated with various concentrations of approximately 1 mol quaternary functionality per monosaccharide comprising glucose. The treated samples are compared to clay samples in water only and kerosene only.
Figure 11:
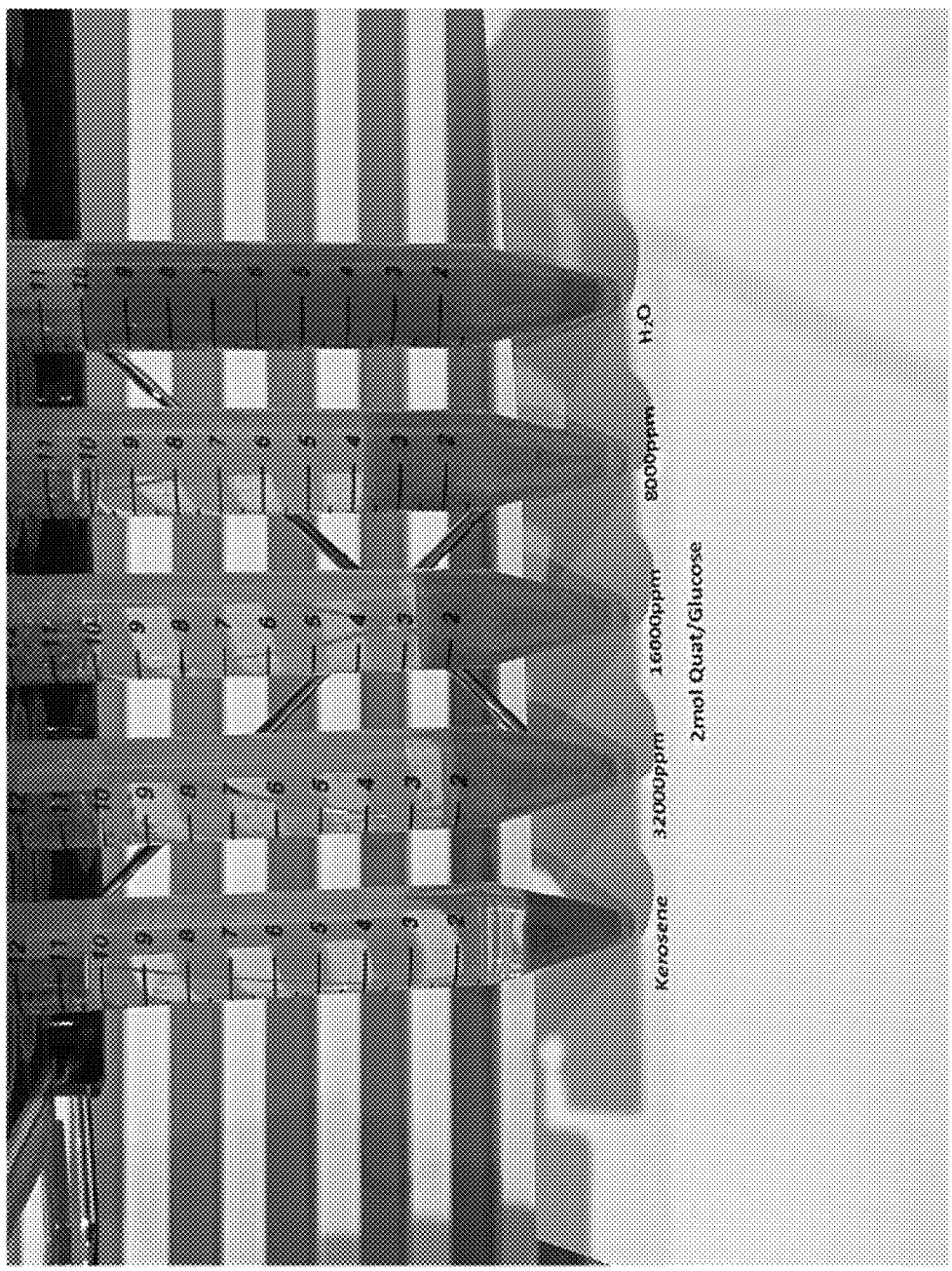
FIG. 11 illustrate montmorillonite clay samples treated with various concentrations of approximately 2 mol quaternary functionality per monosaccharide comprising glucose. The treated samples are compared to clay samples in water only and kerosene only.
Figure 12:
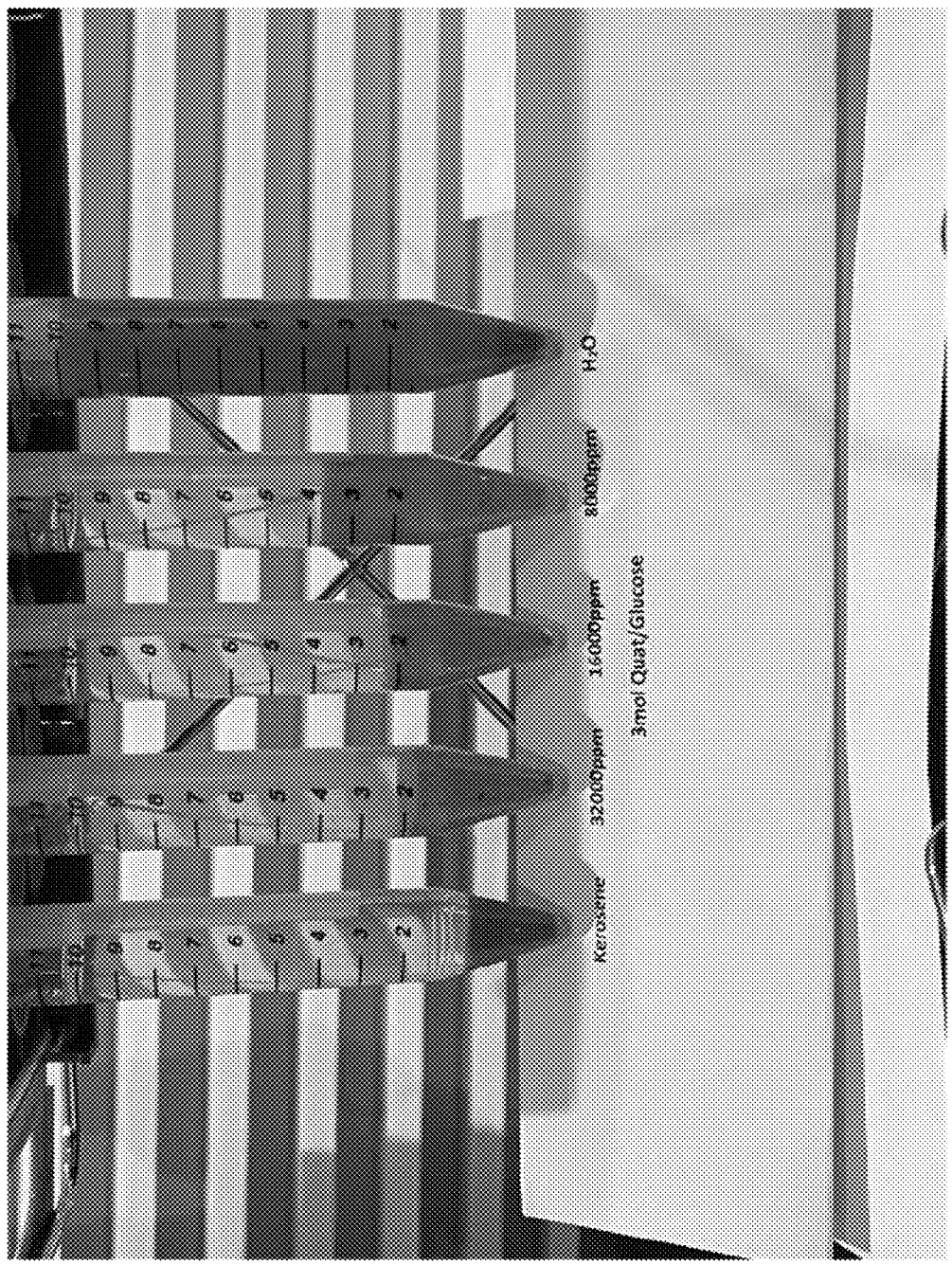
FIG. 12 illustrate montmorillonite clay samples treated with various concentrations of 3 mol quaternary functionality per monosaccharide comprising glucose. The treated samples are compared to clay samples in water only and kerosene only.
Figure 13:
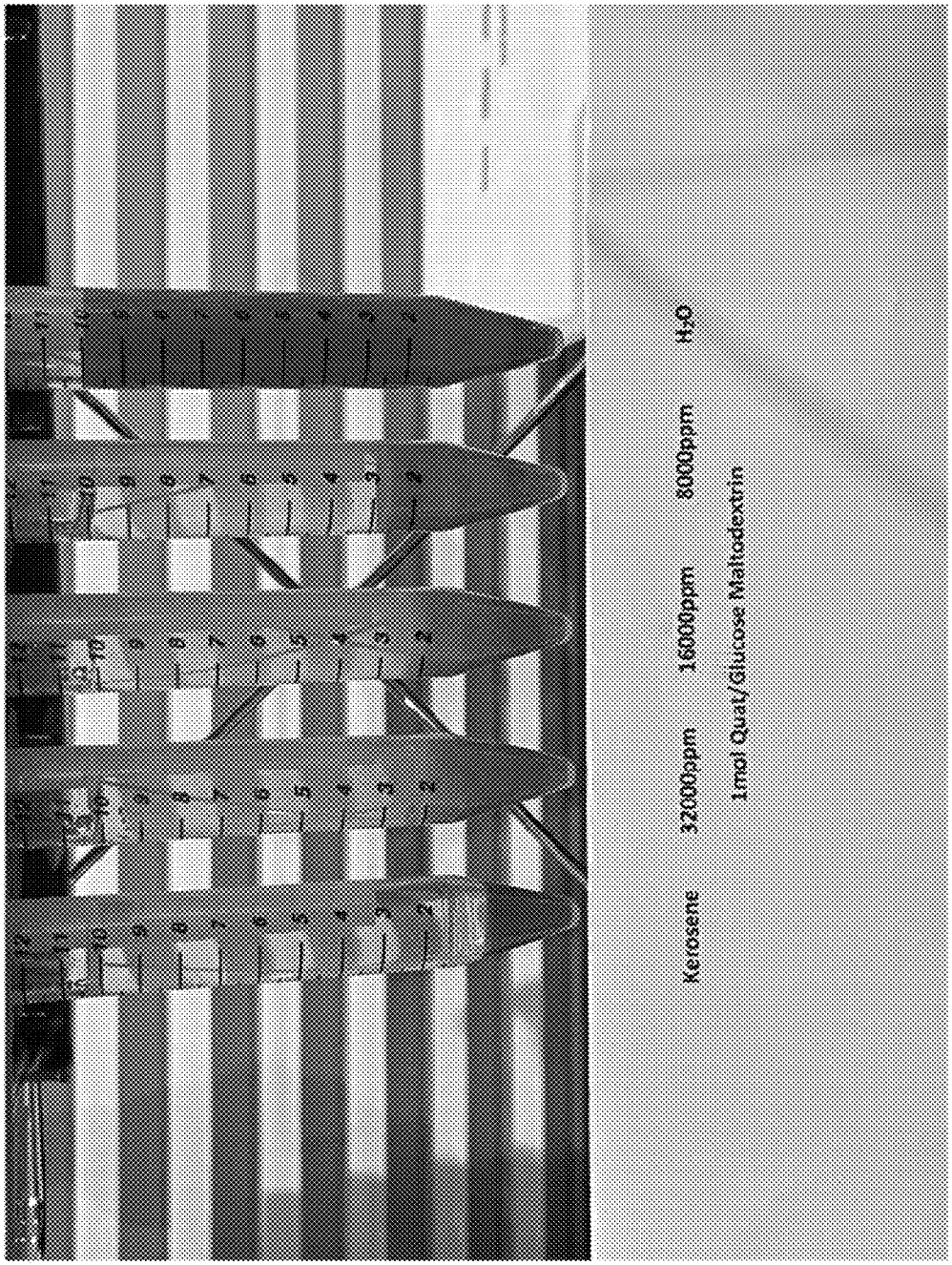
FIG. 13 illustrate montmorillonite clay samples treated with various concentrations of approximately 1 mol quaternary functionality per glucose unit comprising maltodextrin. The treated samples are compared to clay samples in water only and kerosene only.

FIG. 9 illustrates three different passivators at the same 1000 ppm concentration along with two different surfactants at 500 ppm as actives. The surfactants used were Calfax DBA-70 a disulfonate surfactant (Gemini) and Stepfac 8181 and ethoxylate phosphate ester. The water with passivator and surfactant was then treated with 2-amino-2-methylpropanol to a pH of between 9-10. 2-Amino-2-methylpropanol imparts a cationic charge that can adsorb to anionic silicate surfaces (i.e. silicate adsorbent).

Results

Core samples treated with various surfactants, surfactant-based compositions at various concentrations, exemplified by FIG. 5A, FIG. 5B, FIG. 6A, and FIG. 6B improved the surface of the core samples to a water-wet condition. However, the dome of water that formed was stable and the bead of water did not spread.

Core samples treated with surface treatment compositions of the invention used comparatively low concentrations of surfactants with passivators resulting in water-wet surfaces that were unstable at the water-surface interface resulting in a decreasing angle of contact over time, exemplified by FIG. 5C, FIG. 6C, FIG. 7A and FIG. 7B. The passivated surfaces of the core samples caused the water to spread, indicating the attractive forces induced by hydrogen bonding between the water and the polar groups adsorbed on the core surface. The samples treated with the glucose-phosphate ester had a noticeably faster wetting rate compared to the glycerol phosphate ester (e.g. Gly1 and Gly 2).

Figure 14:
FIG. 14 shows treated core samples after 21 days at 90 C. Sample 1 was treated with 1000 ppm 1.8 mol Quat-Glucose and 500 ppm of a disulfonated Gemini surfactant. Sample 2 comprised the same concentrations using a 3 mol Quaternized glucose passivator. The oil cleanly separated without forming an emulsion.

FIG. 14 shows treated core samples after 21 days at 90 C. Sample 1 was treated with 1000 ppm 1.8 mol Quat-Glucose and 500 ppm of a disulfonated Gemini surfactant. Sample 2 comprised the same concentrations using a 3 mol Quaternized glucose passivator. The oil cleanly separated without forming an emulsion.

Figure 15:
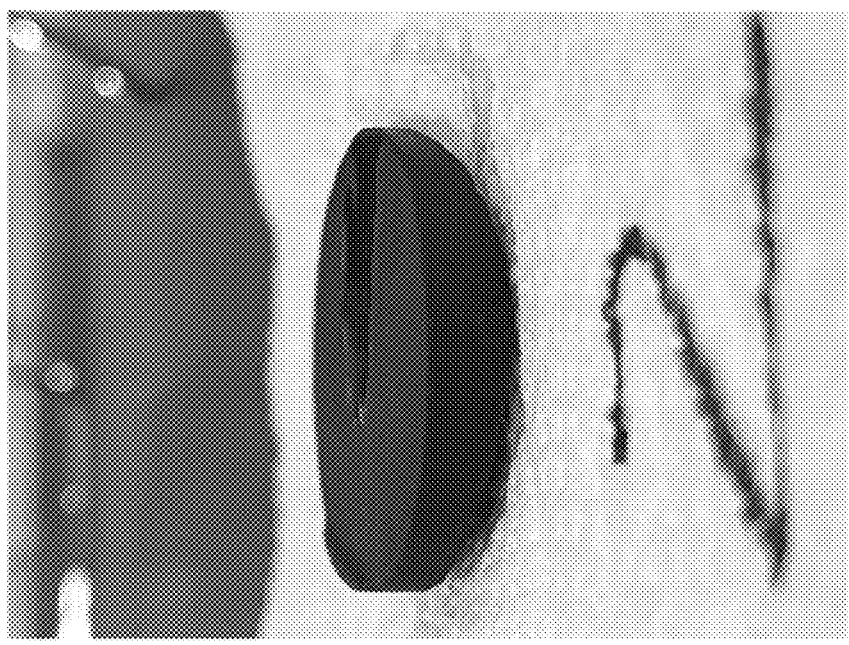
FIG. 15 shows core sample 2 after rinsing with fresh water and drying with air. A water droplet was applied which immediately spread to a water-wet contact angle and continued to spread achieving an angle of contact approaching zero in less than 60 s.

FIG. 15 shows core sample 2 after rinsing with fresh water and drying with air. A water droplet was applied which immediately spread to a water-wet contact angle and continued to spread achieving an angle of contact approaching zero in less than 60 s.

Figure 16C:
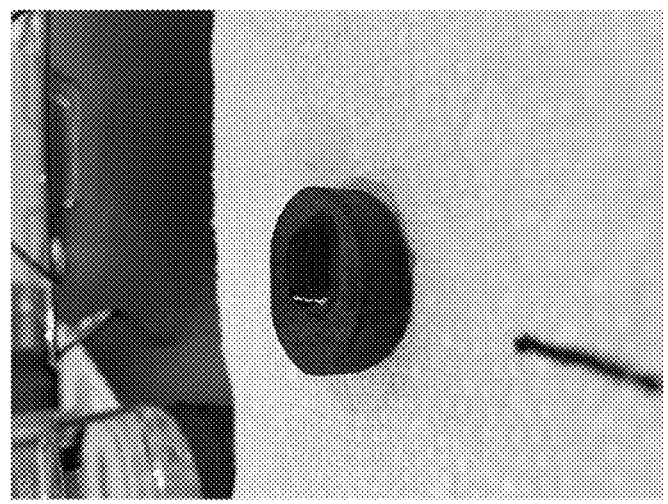
FIG. 16A, FIG. 16B and FIG. 16C show sample 1 after applying a water droplet at 15 s (FIG. 16A) and 60 s (FIG. 16B). The initial angle of contact was water-wet and the droplet immediately began to spread taking on an angle of contact approaching zero in approximately 60 s.
Figure 16B:
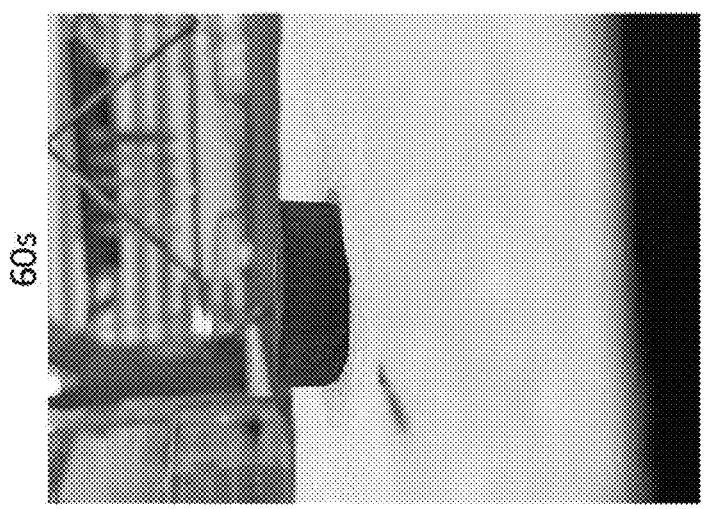
Figure 16A:
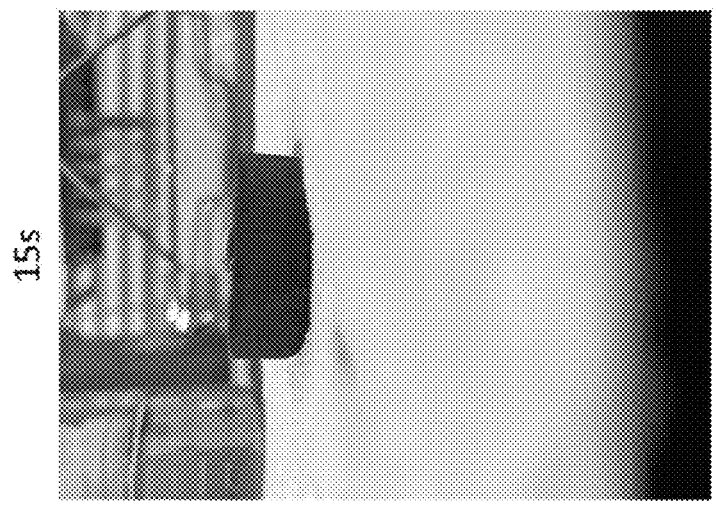
Figure 17A:
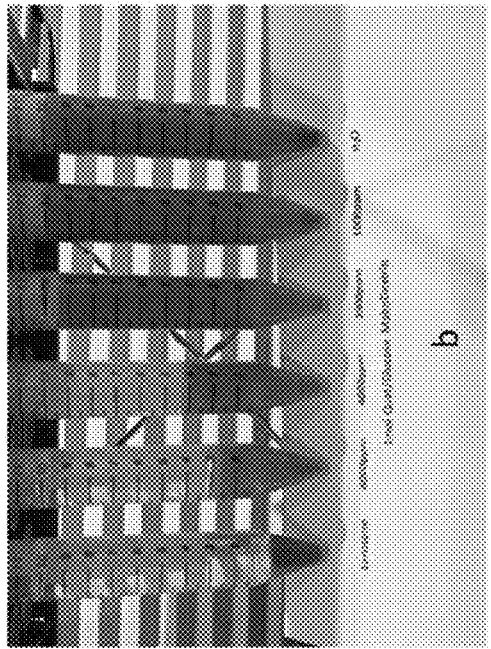
FIG. 17A, FIG. 17B, FIG. 17C, and FIG. 17D illustrate the effect charge density and molecular structure (molecular weight) plays on inhibiting on montmorillonite clay. Figures FIG. 17A and FIG. 17B compare equivalent concentrations of 1 mol quaternized glucose monosaccharide (QMS) FIG. 17A to 1 mol quaternized maltodextrin (QMD) FIG. 17B. With concentrations ranging from 1000 ppm to 4000 ppm the performance is nearly identical with a modest improvement in FIG. 17B at 8000 ppm active QMD. As the charge density (moles of quaternary functionality per monosaccharide molecule) of the QMS increases to 2 mol FIG. 17C and 3 mol FIG. 17D respectively, the clay swelling was dramatically reduced even at low concentrations (2000 ppm) of treatment compared to the 1 mol QMS and 1 mol QMD at the same concentration.
Figure 17B:
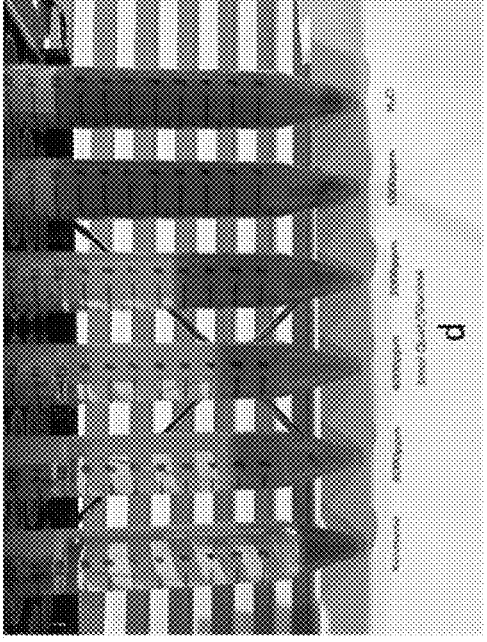
Figure 17C:
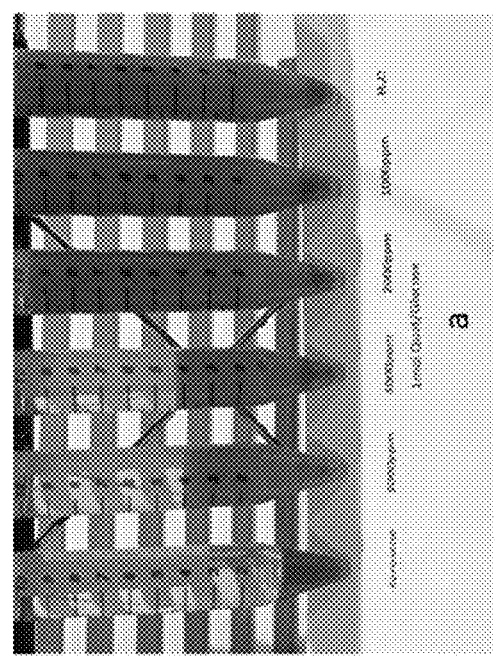
Figure 17D:
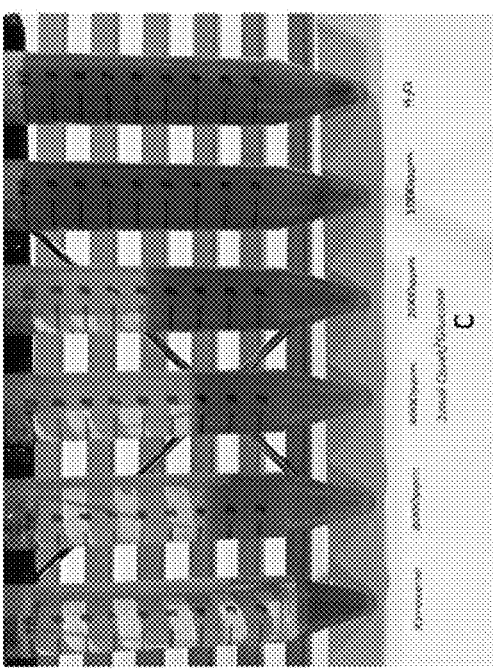

FIG. 16A shows sample 1 after applying a water droplet at 15 s and Fig. B after 60 s. The initial angle of contact was water-wet and the droplet immediately began to spread taking on an angle of contact approaching zero in approximately 60 s. FIG. 16C shows the spread droplet from a top-down view to illustrate the level of spreading.

These results illustrate the surface treatment compositions in the disclosed invention provide a surprising and unexpectedly effective means of altering the surfaces of the formation by conditioning and passivating the surfaces. The invention is not only beneficial for use in chemical Enhanced Recovery Operations to provide persistent water-wet conditions, but opens the pathway to treating the formation during hydraulic fracturing and transitioning the surfaces to a more favorable water-wet condition, especially in tight shale formation like those found in the Bakken. Establishing a persistent water-wet condition when the well is first stimulated will extract more oil and extend the useful life of the virgin well, thereby delaying implementation of enhanced oil recovery methods and their associated expense.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method for increasing the permeability of a hydrocarbon shale formation during stimulation, the method comprising:
   contacting surfaces of a hydrocarbon shale formation with an effective amount of a surface treatment composition, the composition comprising:
   a passivator comprising at least one of a quaternary monosaccharide having from about 1 to 3 moles of quaternary functional groups and a quaternary saccharide having a number of monosaccharide molecules ranging from about 2 to 20 bonded together by glycosidic linkage with from 0.5 to 3 moles of quaternary functional groups per molecule of the monosaccharide in the saccharide;
   a conditioner comprising at least one of a surfactant, a hydrotrope, and a terpene; and
   water;
   the weight percent ratio of passivator and conditioner ranges between 20:1 to 1:20 respectively;
   allowing the surface treatment composition to condition and passivate the surfaces to form passivated surfaces;
   water contacting the passivated surfaces acquires a water-wet angle of contact; and
   wherein the passivator destabilizes the interface between the water and the passivated surfaces causing the water to spread across the passivated surfaces further decreasing the angle of contact.

2. The method in accordance with claim 1, wherein the monosaccharide is selected from the group consisting of glucose, fructose, galatose, talose, iodose, gulose, mannose, altrose, allose, lyxose, xylose, arabinose, ribose, erythrose, glyceraldehyde, threose, and glucosamine.

3. The method in accordance with claim 1, wherein the monosaccharide is glucose and/or fructose.

4. The method in accordance with claim 1, wherein the saccharide comprises maltodextrin.

5. The method in accordance with claim 1, wherein the saccharide comprises at least one of maltose and lactose.

6. The method in accordance with claim 1, wherein the decreasing angle of contact of the spreading water essentially approaches zero.

7. The method in accordance with claim 1, wherein stimulation of the hydrocarbon shale formation comprises hydraulic fracturing.

8. The method in accordance with claim 1, wherein stimulation comprises enhanced oil recovery.

9. The method in accordance with claim 1, wherein the weight percent ratio of the passivator and the conditioner ranges between 20:1 and 1:1 respectively.

10. The method in accordance with claim 1, further comprising at least one of a monophosphate ester of monosaccharide, a bisphosphate ester of monosaccharide and a phosphate diester of monosaccharides.

11. The method in accordance with claim 1, wherein the conditioner has an HLB essentially equivalent to the oil in the hydrocarbon shale formation.

12. The method in accordance with claim 1, wherein the conditioner comprises an emulsion consisting of at least one of a microemulsion and nanoemulsion.

13. The method in accordance with claim 1, wherein the passivator is applied to the hydrocarbon shale formation at a concentration ranging from about 50 to 10000 ppm.

14. The method in accordance with claim 1, wherein the passivator is applied to the hydrocarbon shale formation at a concentration ranging from about 100 to 4000 ppm.

15. The method in accordance with claim 1, wherein the conditioner is applied to the hydrocarbon shale formation at a concentration ranging from about 50 to 5000 ppm.

16. The method in accordance with claim 1, wherein the conditioner is applied to the hydrocarbon shale formation at a concentration ranging from about 100 to 4000 ppm.

* * * * *